(12) United States Patent
Gryniewski et al.

(10) Patent No.: US 8,074,935 B2
(45) Date of Patent: Dec. 13, 2011

(54) SATELLITE REFUELLING SYSTEM AND METHOD

(75) Inventors: Lawrence Gryniewski, Mississauga (CA); Derry Crymble, Toronto (CA); John Cameron Ower, Oakville, CA (US)

(73) Assignee: MacDonald Dettwiler & Associates Inc., Brampton (CA)

( * ) Notice: Subject to any disclaimer, the term of this patent is extended or adjusted under 35 U.S.C. 154(b) by 767 days.

(21) Appl. No.: 12/073,795

(22) Filed: Mar. 10, 2008

(65) Prior Publication Data

US 2008/0237400 A1 Oct. 2, 2008

Related U.S. Application Data

(60) Provisional application No. 60/905,827, filed on Mar. 9, 2007.

(51) Int. Cl.
*B64G 1/64* (2006.01)
(52) U.S. Cl. ............... 244/172.5; 244/172.4; 244/135 A
(58) Field of Classification Search ............... 244/172.2, 244/172.3, 172.4, 172.5, 135 A, 135 R; 251/149.4; 141/346–349
See application file for complete search history.

(56) References Cited

U.S. PATENT DOCUMENTS

| | | | | |
|---|---|---|---|---|
| 4,831,531 | A * | 5/1989 | Adams et al. ..................... | 701/2 |
| 4,955,654 | A * | 9/1990 | Tsuchihashi et al. ........ | 294/86.4 |
| 5,582,366 | A * | 12/1996 | Hamant et al. ............ | 244/135 A |
| 6,739,555 | B2 * | 5/2004 | Mazanek et al. ............ | 244/172.4 |
| 7,156,348 | B1 * | 1/2007 | Kistler et al. .............. | 244/172.4 |
| 7,370,835 | B2 * | 5/2008 | Kistler et al. .............. | 244/173.1 |

(Continued)

FOREIGN PATENT DOCUMENTS
WO 2007126526 A1 11/2007

OTHER PUBLICATIONS

Madison, Richard "Micro-Satellite Based, On-Orbit Servicing Work at the Air Force Research Laboratory", In: Aerospace Conference Proceedings, 2000IEEE, Big Sky, MT, USA.

(Continued)

*Primary Examiner* — Joshua Michener
*Assistant Examiner* — Philip J Bonzell
(74) *Attorney, Agent, or Firm* — Lynn C. Schumacher; Hill & Schumacher

(57) ABSTRACT

The present invention provides a method, system and apparatus for robotic refueling of satellites. The system may include a dedicated refueling satellite launched directly from either earth, or alternatively it could be launched from another larger mother spacecraft or space station in which the refueling satellite is ferried into space in the case of the larger space craft or it may be stored on the space station until needed from which it can be launched. The system includes a robotic arm, suitable tools which can be affixed to the end effector of the robotic arm required for accessing, opening and closing the fuel fill valve on the satellite being serviced, storage and retrieval stations on a tool caddy on which the tools and various fuel fill valve caps are stored. The system is under teleoperation by a remotely located operator, for example located on earth, in the mother station or in the space station. Cameras are included focussed on the robotic arm and end effector and images are transmitted to the operator to allow the operator to direct and control the refueling procedure. The system may also be configured to be operated autonomously under computer control.

52 Claims, 16 Drawing Sheets

U.S. PATENT DOCUMENTS

| | | | |
|---|---|---|---|
| 7,575,200 B2 * | 8/2009 | Behrens et al. | 244/172.3 |
| 7,823,837 B2 * | 11/2010 | Behrens et al. | 244/172.5 |
| 2006/0145024 A1 | 7/2006 | Kosmas | |
| 2006/0151671 A1 | 7/2006 | Kosmas | |
| 2007/0051854 A1 * | 3/2007 | Behrens et al. | 244/172.3 |
| 2007/0228219 A1 * | 10/2007 | Behrens et al. | 244/172.5 |
| 2007/0228220 A1 * | 10/2007 | Behrens et al. | 244/172.5 |

OTHER PUBLICATIONS

Mar. 18, 2000 to Mar. 25, 2000, vol. 4 ISBN: 0-7803-5846-5, p. 215-226.

Manouchehri et al, "Automated Resupply of Consumalbes: Enhancement of Space Commercialization Opportunities" In: Fifth Annual Workshop on Space Operations Applications and.

Research (SOAR '91) NASA CP-3127, Kumar Krishen, 788 pages, published by NASA, Washington, D.C. 1992, p. 407-411.

Eberhardt et al, "Orbital Spacecraft Resupply Technology", in: AIAA/ASME/SAE/ASEE 22nd Joint Propulsion Conference Jun. 16-18, 1986, Huntsville, Alabama.

Cox et al, Orbital Spacecraft Consumables Resupply System (OSCRS), Final Report, vol. II, Study Results, National Aeronautics and Space Administration Lyndon B. Johnson.

Space Center, Mar. 1987.

European Search Report; (EP 8733557.6); MacDonald Dettwiler & Associates Inc., completed Jan. 14, 2011.

Oda M et al: "ETS-VII, space robot in-orbit experiment satellite", Robotics and Automation, 1996. Proceedings., 1996 IEEE International Conference on Minneapolis, MN, USA Apr. 22-28, 1996, New York, NY, USA, IEEE, US, vol. 1, Apr. 22, 1996, pp. 739-744.

* cited by examiner

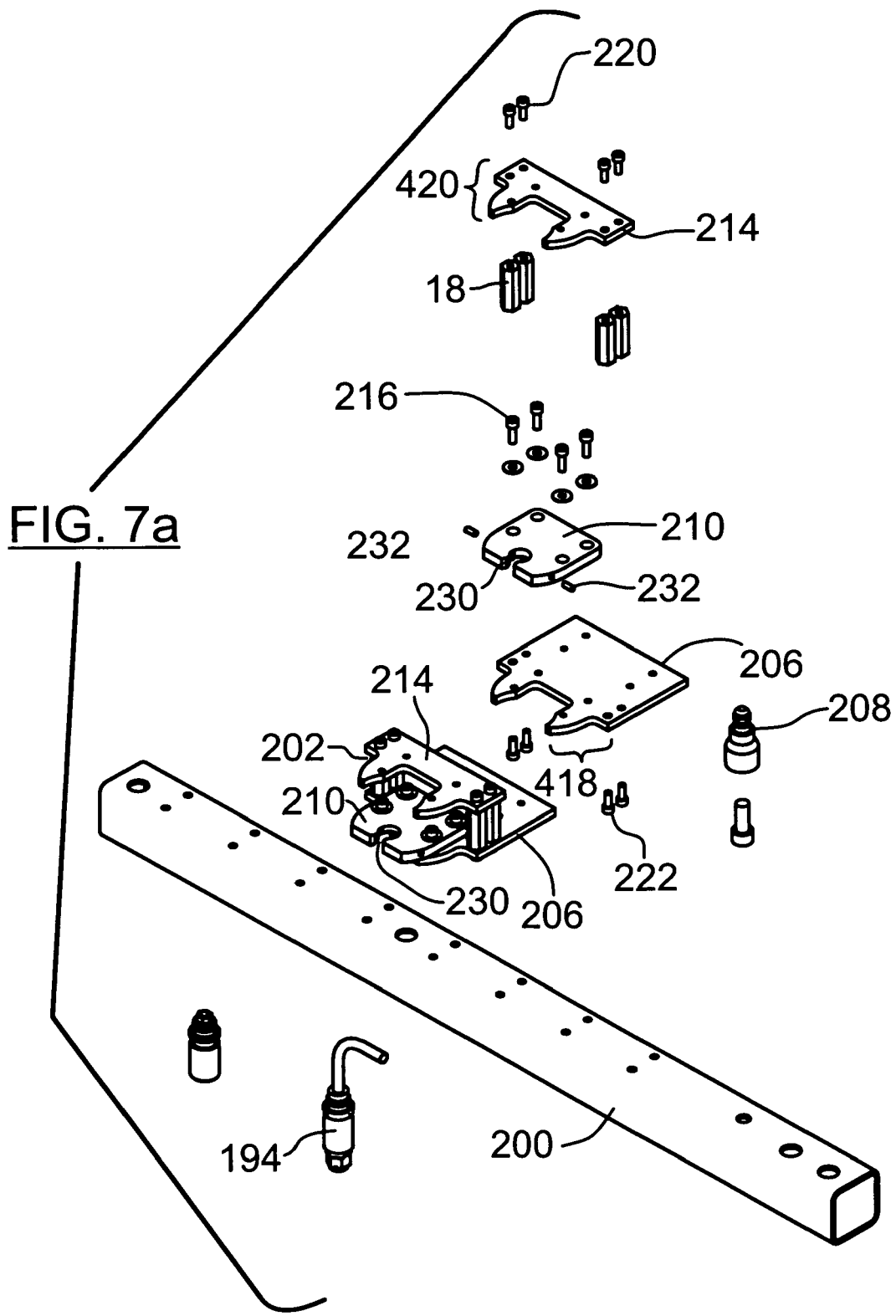

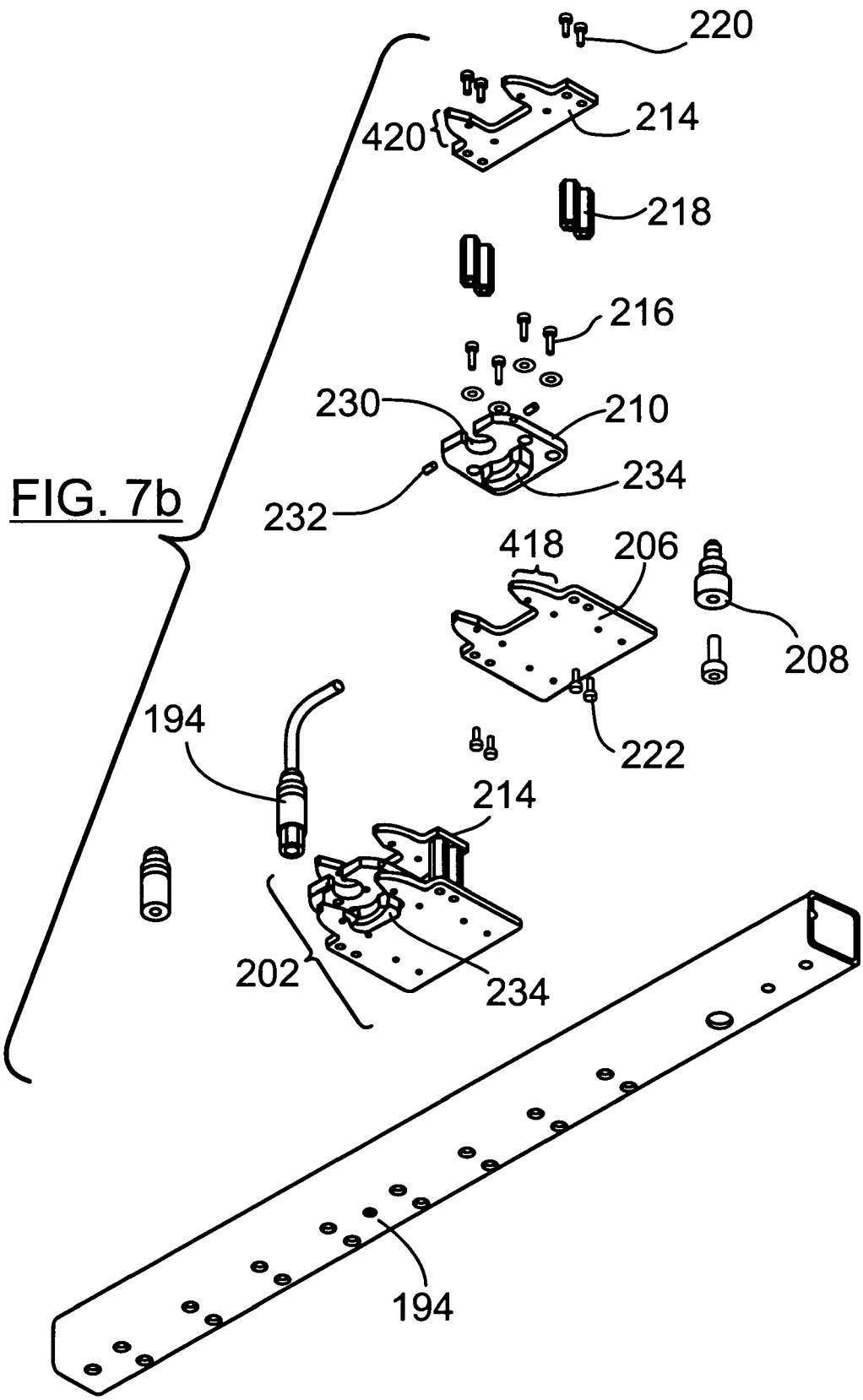

SATELLITE REFUELLING SYSTEM AND METHOD

CROSS REFERENCE TO RELATED U.S. PATENT APPLICATION

This patent application relates to U.S. provisional patent application No. 60/905,827 filed on Mar. 9, 2007 entitled ROBOTIC SATELLITE REFUELING METHOD AND SYSTEM, filed in English, which is incorporated herein in its entirety by reference.

FIELD OF THE INVENTION

The present invention relates to a satellite refueling system and method for refueling satellites.

BACKGROUND OF THE INVENTION

Many geosynchronous orbit communication satellites currently in operation were designed with a finite amount of fuel and were not designed for the possibility of being refueled. The design philosophy relied upon replacement of the satellites after they had exhausted the on-board fuel supply. In view of the expense of replacing satellites, it would be very advantageous to be able to refuel communication satellites which are either near their end of life, or have suffered an infant propulsion system failure, thereby extending their operational life by several years.

In many incidents, at the end of a satellite's 10 to 15 year life all of its subsystems are still functional and it is only the depletion of the carefully budgeted fuel load that drives retirement of the satellite. Using a current economic model, the ability to refuel 10 to 12 of these end of life satellites in one mission, would extend their useful life by 3 to 5 years and thereby delay the need to outlay the $150-$250 M to launch a replacement. Some satellites suffer from primary propulsion system failures soon after they are launched. In these cases the entire book value must be written off and compensation paid to the operator by the space insurer. The satellite becomes an asset of the space insurer and will eventually have to be disposed of in a graveyard orbit. If one of these assets can be refueled, extending its life by 5 to 10 years, most of the value of the spacecraft can be recovered.

The key technical difficulty is that these satellites were not designed for robotic servicing, and it is not generally accepted that such missions are technically possible. Specifically, most satellites are designed with fuel fill and drain valves that were intended to be filled once prior to launch and never opened or manipulated again. Thus, accessing these fill and drain valves remotely presents several major challenges and would involve several operations, each of which is difficult to accomplish robotically including: cutting and removal of the protective thermal blankets, removal of several lockwires hand wrapped around the valves, unthreading and removing outer and inner valve caps, mating the fuel fill line to the valve nozzle, mechanically actuating the valve, and when refueling is complete, replacing the inner valve cap.

On-orbit servicing has been the subject of much study over the past thirty years. The idea of maintaining space assets rather than disposing of and replacing them has attracted a variety of ideas and programs. So far the concept has only found a home in the manned space program where some success can be attributed to the Hubble Space Telescope repair missions, Palapa-B2 and Westar rescue missions and the assembly and maintenance of the International Space Station.

Robotic capture and servicing of existing geostationary spacecraft has never been demonstrated. Over the past decade several of the key technologies required for orbital servicing have matured. These include autonomous rendezvous (ETS-VII (1998), XSS-11 (2005), DART (2006), Orbital Express (2007), autonomous docking (ETS-VII, Soyuz, Orbital Express), ground based robotic tele-operation (ETS-VII, SSRMS (2005), Orbital Express), and on orbit fluid transfer (ISS). However a gap exists in the technologies required to service or re-fuel an un-prepared satellite in orbit. An unprepared satellite is defined here as a spacecraft that was not designed to be manipulated or repaired by a robotic system. Some advances have been made in the technologies required to dock with an unprepared satellite, and both DLR (German Aerospace Center) and MDA have demonstrated through various R&D efforts that docking to a GEO communication satellite via the spacecraft's apogee kick motor is a viable docking option.

To date there have been no technologies disclosed that can solve the problem of accessing the fuel system of an unprepared satellite for the purpose of replenishing station keeping fuel. The majority of satellites in orbit today were not designed with orbital refueling in mind and access to the fuel system is designed to be accessed by a human on earth before launch. The technologies required to access the target spacecraft's fuel system for the purposes of refueling still have a very low technology readiness level, and are generally considered to be the main obstacle to a successful servicing mission.

United States Patent Publication No. 2006/0151671 (Kosmos) discloses an actuator arm mounted on a spacecraft designed as a servicing manipulator for use within a spacecraft service bay and includes an actuator arm connected to a base using flexible connection tapes.

United States Patent Publication No. 2006/0151671 discloses a servicing communication architecture in which the communication between a ground station and the servicing satellite is carried out via the communication system of the client satellites communication links. Also disclosed is a general servicing architecture in which target satellites are captured and returned to a servicing spacecraft. Within this servicing spacecraft it is proposed that any required servicing operations could be conducted.

The publication "On-Orbit Servicing by "HERMES On-Orbit-Servicing System, Policy Robust Planning", C. Kosmos, American Institute of Aeronautics and Astronautics, SpaceOps 2006 conference proceedings", pp 1 to 6, Apr. 26, 2006, discloses a satellite refueling architecture that requires each satellite to be serviced to have a custom quick disconnect (QD) coupling attached to its service valve before launch. A preliminary design for a valve access tool used to access this valve is also presented.

Therefore, it would be very advantageous to provide a satellite refueling system for earth-based controlled refueling of unprepared satellites.

SUMMARY OF THE INVENTION

The present invention provides a method, system and apparatus for robotic refueling of satellites. The system may include a dedicated refueling satellite launched directly from either earth, or alternatively transiting from another larger mother spacecraft or space station in which the refueling satellite is launched into space for the refueling mission or it may be stored on the space station, on-call for the next needed refueling operation. The system includes a positioning mechanism such as a robotic arm, suitable tools which can be affixed to the end effector of the robotic arm required for accessing, opening and closing the fuel fill valve(s) on the satellite being serviced, storage and retrieval stations on a tool caddy on which the tools and various fuel fill valve caps are stored.

In one embodiment, the system is tele-operated by a remotely located operator, for example located on earth, or in a space station. Cameras in the refueling system are focussed on the robotic arm and end effector, with the operator using the transmitted images to direct and control the refueling procedure.

In another embodiment, the refueling system may be equipped with an artificial vision function which is used to register the worksite in the vicinity of the fill-drain valve, providing relative positions between the servicing arm/tool combination with the valves. The refueling system is then controlled in a supervised autonomous manner using an updated model of the worksite derived from the artificial vision function registration information. The system disclosed herein may also be used for fuelling for the first time satellites prior to launch, thereby eliminating or at least reducing the risk of a refueling technician being exposed to the toxic fuel in the event of a mishap.

In one aspect of the present invention there is provided a system for fuelling an unprepared or partially prepared client satellite, comprising:

fluid transfer means for transferring fuel from a fuel storage tank to a fuel tank on the client satellite and/or for transferring oxidizer from an oxidizer storage tank to an oxidizer tank on the client satellite;

tool means for coupling a fuel fill line to a fuel port on the fuel storage tank and decoupling said fuel fill line therefrom, and/or for attaching an oxidizer fill line to an oxidizer port on the oxidizer tank and decoupling said oxidizer fill line therefrom;

sensing means for determining a relative displacement between the tool means and a fuel and oxidizer ports on the client satellite;

positioning means connected to said tool means for positioning said tool means with respect to said fuel and oxidizer ports on said client satellite for coupling and decoupling said fuel and oxidizer fill lines to said fuel and oxidizer ports; and control means in communication with said sensing means, positioning means and tool means to control operation of the positioning means and the tool means based on feedback from the sensing means.

The present invention provides a tool for fuelling an unprepared or partially prepared client satellite which includes a fuel tank, a fuel fill valve and a valve actuation nut on said fuel fill valve used to open and close said fuel fill valve and an access valve cap on said access valve, and optionally includes an oxidizer port on an oxidizer tank having an oxidizer fill valve and a valve actuation nut on said oxidizer fill valve used to open and close said oxidizer fill valve and an access valve cap on said oxidizer fill valve, and wherein said tool comprises;

interchangeable socket modules, a first socket module for removing and replacing said access valve cap on said fuel fill valve, a second socket module connected to said fuel fill line for engaging the fuel fill valve for coupling said fuel fill line to said fuel tank, a third socket module for engaging said access valve cap on said oxidizer fill valve on the oxidizer tank, and a fourth socket module for engaging said oxidizer fill valve for coupling said oxidizer fill line to said oxidizer tank, a support frame, socket module holder mechanism mounted on said support frame configured to accept said interchangeable socket modules;

a socket drive mechanism mounted on said support frame for actuating said first, second, third and fourth socket modules when seated in said socket module holder mechanism;

a clamping mechanism mounted on said support frame to secure the valve tool to a reaction area on the fuel fill valve and oxidizer fill valve, said clamping mechanism being configured to localize torque generated by said valve tool for ensuring that any reaction torques from the socket drive mechanism are reacted locally to prevent damage to the valve; and a valve actuation mechanism mounted on said support frame to engage and actuate said valve actuation nut on the fuel fill valve and oxidizer fill valve.

There is provided a method of robotically fuelling a satellite, comprising:

a) instructing a robotic arm to access a fuel fill valve on a fuel tank on said satellite by the steps of transmitting visual images of a region of the satellite containing the fuel fill valve to a teleoperator remote from the satellite, using the visual images to guide the teleoperator to instruct the robotic arm in the steps of affixing a thermal blanket cutting tool on said end effector, engaging said thermal blanket cutting tool to the thermal blanket encasing said fuel fill valve and cutting an access opening in said thermal blanket removing the thermal blanket cutting tool and affixing a cap removal tool on said end effector and engaging said cap removal tool to the fuel fill valve outer cap and removing and storing said outer cap, removing the cap removal tool and affixing a valve tool on said end effector, affixing a valve B-nut removal and replacement tool to said valve tool and engaging said valve tool to said fuel fill valve and removing and storing a valve B-nut located on said fuel fill valve, removing the valve B-nut removal and replacement tool and affixing a fuel-line coupling on said valve tool, attaching the fuel-line coupling to said fuel fill valve, opening said fuel fill valve and refueling said fuel tank, closing said fuel valve, detaching said fuel-line coupling from said fuel fill valve, removing and storing said fuel-line coupling from said end effector, affixing said valve nut removal and replacement tool to said valve tool and retrieving and mounting said valve B-nut onto said fuel line valve.

The refueling apparatus comprises various components including the various tools needed for accessing and refueling the satellite, the robotic positioner adapted to have affixed thereto the various tools, and the storage caddy in which the various tools are stored. The system includes the refueling apparatus integrated with the refueling satellite to which it is attached including, the cameras and communication system for transmitting images from the cameras and instructions from the operator. Existing satellites may be modified to carry the robotic arm, tool caddy, tools, cameras and refueling communication system.

A further understanding of the functional and advantageous aspects of the invention can be realized by reference to the following detailed description and accompanying drawings.

BRIEF DESCRIPTION OF THE DRAWINGS

The invention will be more fully understood from the following detailed description thereof taken in connection with the accompanying drawings, which form part of this application, and in which:

FIG. 7a is a an exploded disassembled view of the caddy of FIG. 6 looking from one direction;

FIG. 7b is a an exploded disassembled view of the caddy of FIG. 6 looking from similar to FIG. 7a but looking from another direction;

DETAILED DESCRIPTION OF THE INVENTION

Generally speaking, the systems described herein are directed to a satellite refueling method and apparatus for refueling satellites. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a satellite refueling apparatus, system for and method for refueling satellites.

Figure 1:
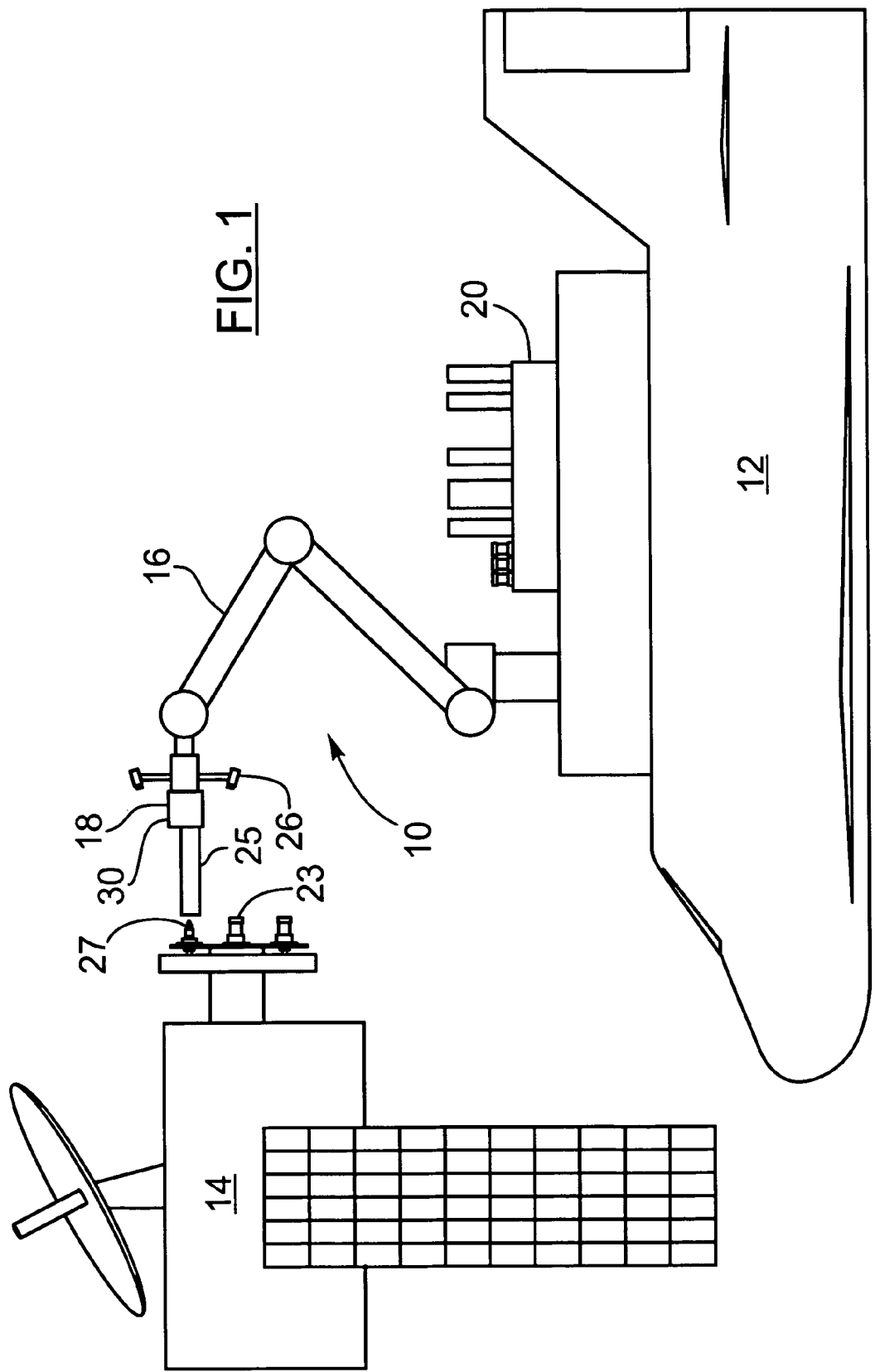
FIG. 1 is shows a robotic satellite refueling apparatus for refueling satellites mounted on a servicing spacecraft and refueling a satellite.
Figure 1A:
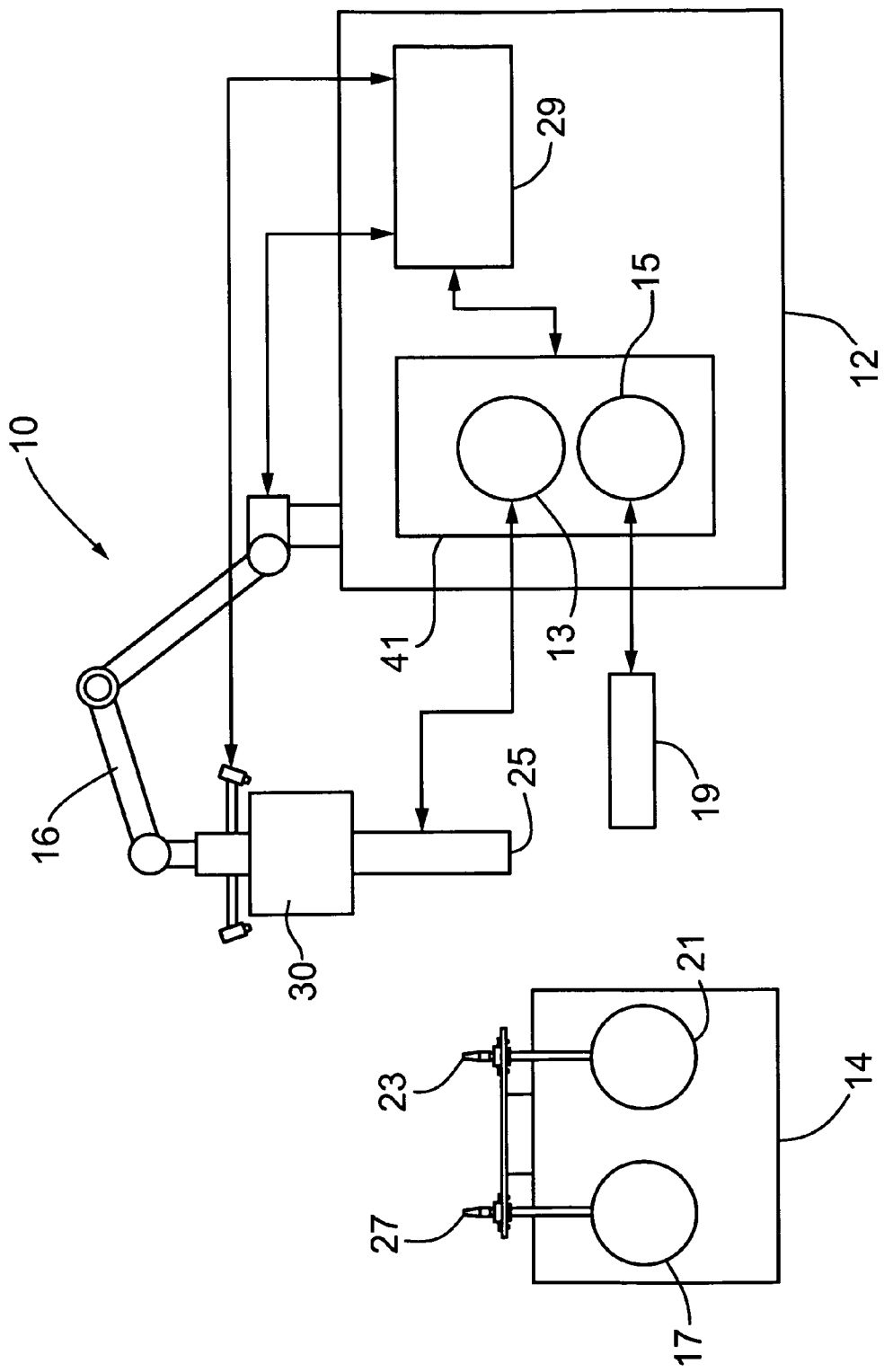

Referring to FIGS. 1 and 1a, broadly, the present invention is directed to refueling system for refueling an unprepared or partially prepared client satellite 14. The system includes a fluid transfer system 41 for transferring fuel from a fuel storage tank 15 on the servicer spacecraft 12 to a fuel tank 21 on the client satellite 14 and for transferring oxidizer from an oxidizer storage tank 13 on a servicing spacecraft 12 to an oxidizer tank 17 on the client satellite 14. The system includes a tool mechanism 30 for coupling a fuel fill line 19 to a fuel port 23 on fuel tank 21 and decoupling the fuel fill line 19 therefrom, and for attaching an oxidizer fill line 25 to an oxidizer port 27 on the oxidizer tank 17 and decoupling the oxidizer fill line 25 therefrom. It will be appreciated that while FIGS. 1 and 1a, do not show the details, fluid transfer system 41 in addition to containing the storage tanks for oxidizer and fuel, also contain all the other required equipment for pumping oxidizer and fuel from system 41, such as, but not limited to liquid pumps, filters, propellant management devices, valves, valve actuators and various sensors and monitors. The fluid transfer system described will be used to replenish either fuel or oxidizer or both to satellites which require these fluids replenished. This includes both bi-propellant propulsion system satellites and mono-propellant propulsion system satellites.

The refueling system includes a sensing array 26 for determining a relative displacement between the tool mechanism and fuel and oxidizer ports 23 and 27 on the client satellite 14. The system includes a positioning mechanism 16 connected to the sensing array 26 for positioning the tool mechanism 30 with respect to the fuel and oxidizer ports 23 and 27 on the client satellite 14 for coupling and decoupling the fuel and oxidizer fill lines to the fuel and oxidizer ports respectively. The system includes a control system 29 in communication with the sensing mechanism, positioning means and tool mechanism to control operation of the positioning mechanism and the tool mechanism based on feedback from the sensing mechanism.

In the context of the present patent application, the phrase "unprepared client satellite" means a satellite that has been launched into orbit without any design features that would simplify or facilitate on orbit refueling or servicing.

In the context of the present patent application, the phrase "partially prepared client satellite" means a satellite on which on orbit servicing or refueling has been considered in its design. Standard interfaces are used on these satellites but implemented with consideration to facilitate on orbit servicing. An example of this could be a redesign of the thermal system to that would allow removal of thermal blankets from the region around the fuel or oxidizer fill ports.

As shown in FIG. 1 the positioning mechanism 16 includes a robotic arm (which may be as a simple as a two degree-of-freedom mechanism) and an end effector 18 which is adapted to receive and mate with various tools such as valve tool 30, along with the other tools that are contained in a tool storage container 20. The tools include the valve tool 30 as mentioned above, as well and cutters for cutting thermal blankets enveloping the fill valves, tools for disabling lockwires that may be fixing various moving components on the fill valves and a tool to unfasten and remove outer caps on the fill valve.

Client satellite 14 may be of any kind in any orbit requiring fuel to increase the lifetime of the satellite. The servicing spacecraft 12, while shown in the form of the space shuttle may be any type of spacecraft, manned or unmanned as long as it is in communication with operators on earth to direct the robotic arm 16 during the refueling process. Alternatively, the robotic arm 16 may be operated autonomously during the refueling process as will be discussed hereinafter. In this mode of operation, the refueling system is equipped with an artificial vision function which is used to register the worksite in the vicinity of the fill-drain valve.

The refueling system is then controlled in an autonomous manner using an updated model of the worksite derived from the artificial vision function registration information. The sensor system 26 is shown in the embodiment in FIGS. 1 and 1b as two cameras included to provide visual images of the tool 30 which are transmitted to the ground station for providing confirmation to the operator of the autonomous refueling operation procedure. While two cameras are shown, and are considered to be the optimum number needed, it will be understood more or less cameras 26 may be included.

As mentioned above, the control system used for controlling the refueling system may be configured in one of several ways. In one embodiment of the system, the refueling operation may be controlled by a teleoperator, namely a person remotely operating the system through a user interface who may be located on earth or in another spacecraft or space station. In another embodiment the system may be configured to be operated in an autonomous mode of operation, in which the control system includes computers which control all or some of the servicer refueling operations. These computers may be located on the servicer spacecraft or they may be located on earth, or on another spacecraft. In another embodiment the refueling system may be configured to operate in a supervised autonomy mode such that the control system involves a combination of teleoperation and autonomous operation. In supervised autonomy a user monitors the servicing operations, and gives proceed commands to the autonomous operations which can be elemental operations or preprogrammed chains of commands. Thus the control system may be configured to have some tele-operation, and some autonomous or supervised autonomous operation for this mission. The system may be configured to be able to use all these modes of operation with a user able to switch between the different modes.

The valve tool 30 includes a support frame, a socket module holder mechanism mounted on the support frame configured to accept interchangeable socket modules to be described hereinafter, and a socket drive mechanism mounted on the support frame for actuating the socket modules when seated in the socket module holder mechanism. The valve tool 30 includes a clamping mechanism mounted on the support frame to secure the valve tool 30 to a reaction area of the fuel fill valve and oxidizer fill valve. The clamping mechanism is configured to localize torque generated by the valve tool 30 for ensuring that any reaction torques from the socket drive mechanism are reacted locally to prevent damage to the valves on the tanks of the client satellite. The valve tool 30 includes a valve actuation mechanism mounted on the support frame used to open and close the fuel and oxidizer fill valves by actuating their respective valve actuation nuts. These components making up the valve tool 30 will now be discussed in more detail.

Figure 2:
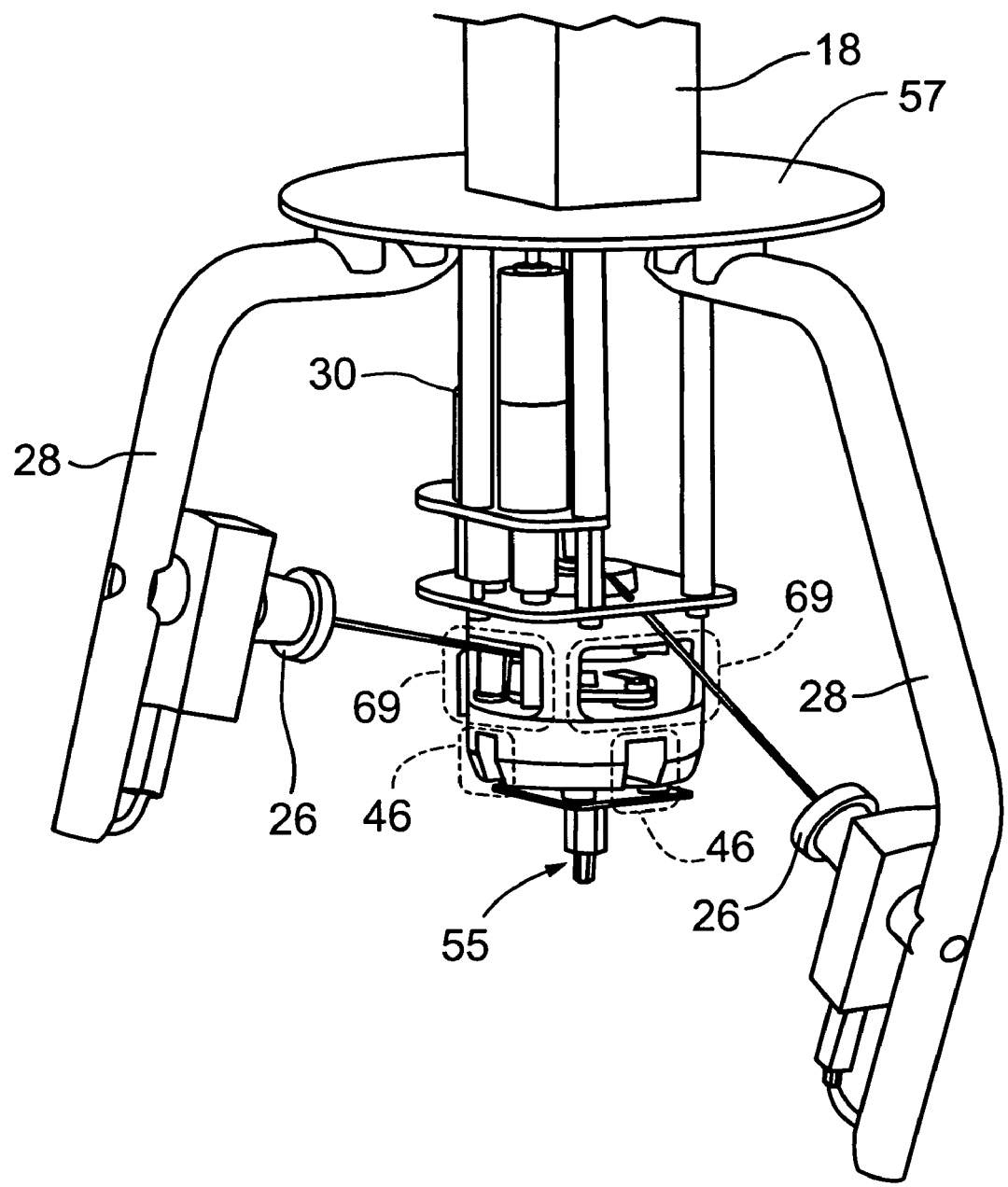
FIG. 2 shows a perspective view of the apparatus of FIG. 1 with two cameras mounted on booms focused on the refueling tool for visually assisting operators on earth instructing the robot in the refueling procedure.
Figure 3:
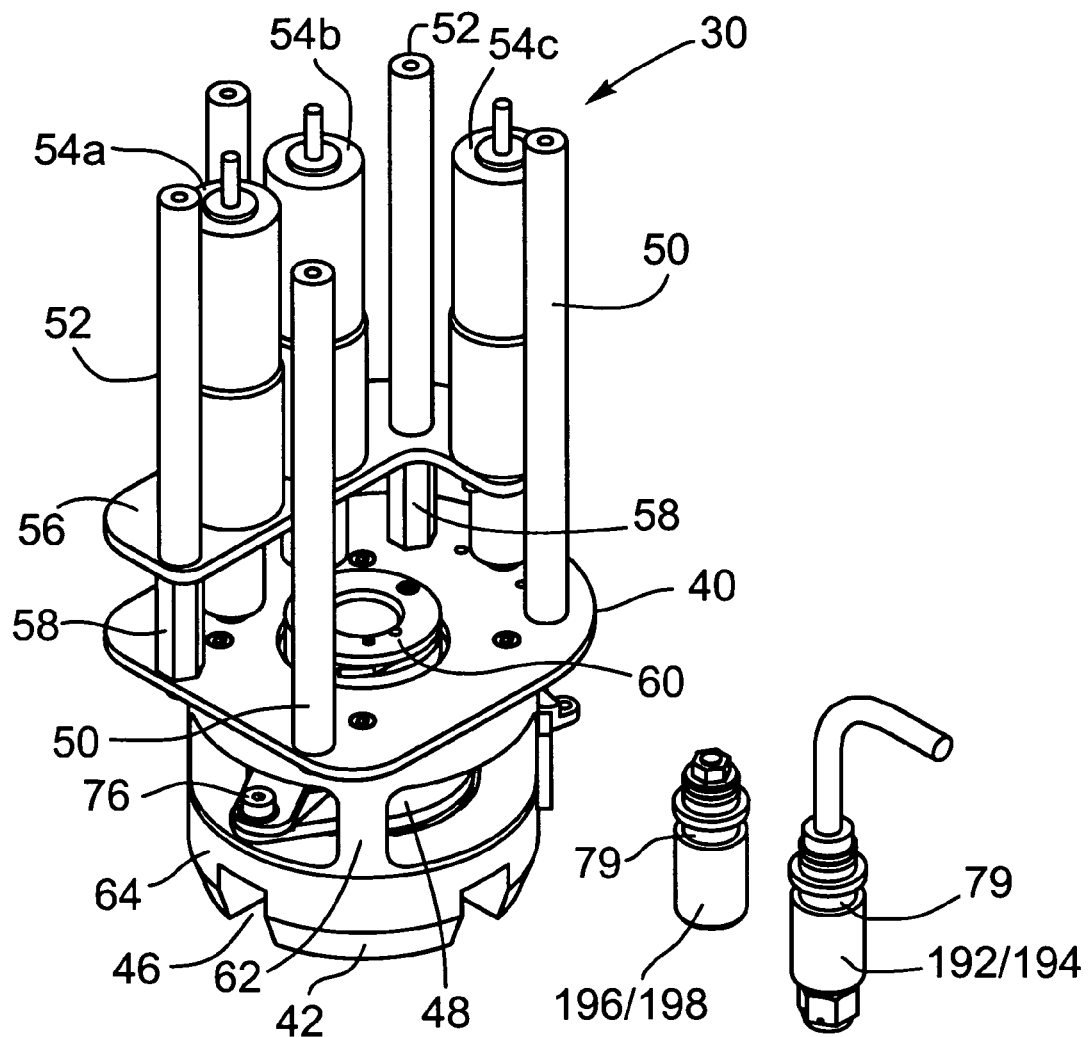
FIG. 3 shows a perspective view of a partially assembled valve tool forming part of the refueling system of the present invention.
Figure 4:
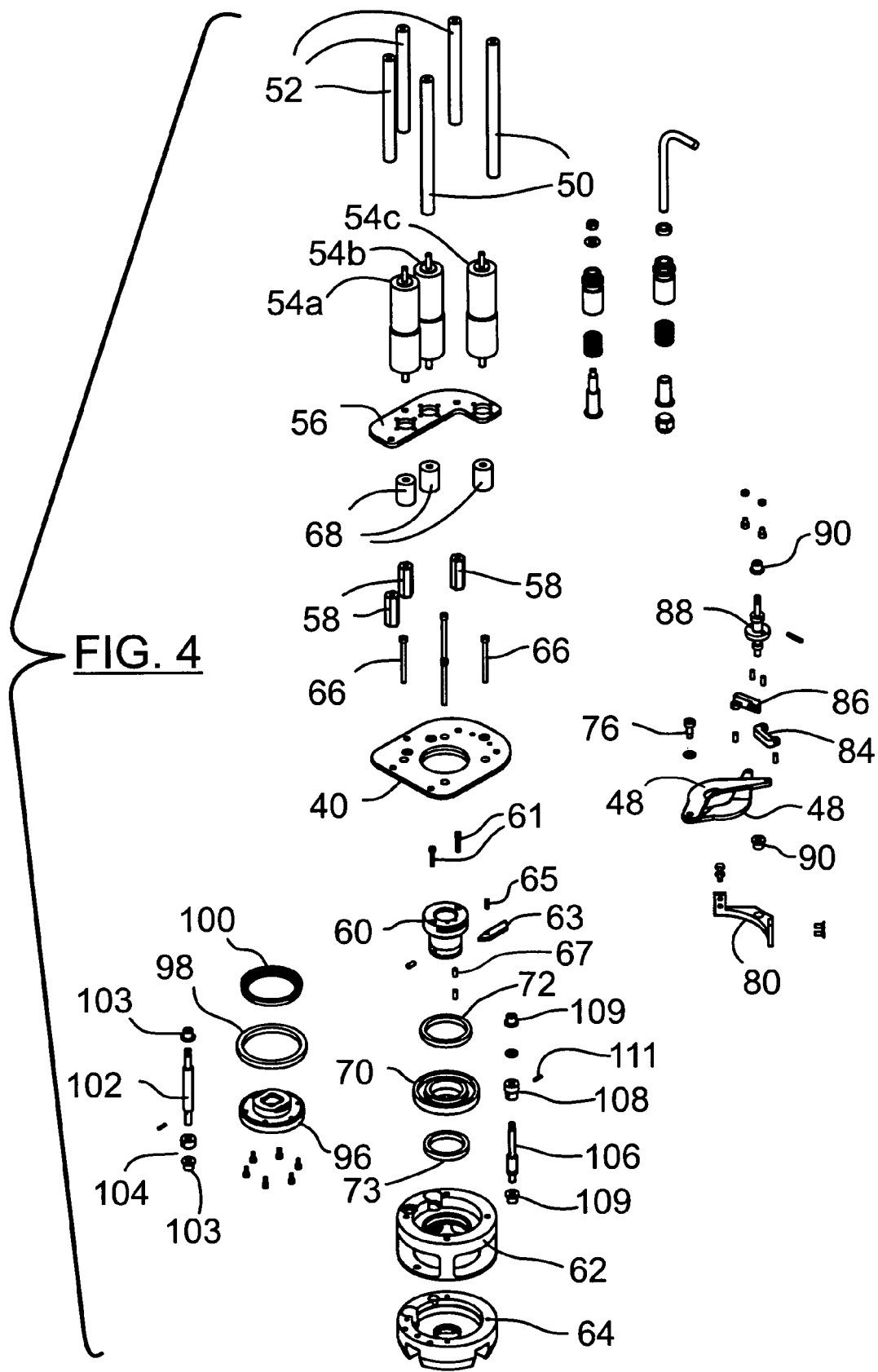
FIG. 4 shows an exploded disassembled view of the valve tool.

FIG. 2 shows a close up of an embodiment of valve tool 30 mounted on end effector 18 with cameras 26 mounted on booms 28 which are configured to provide a clear and unobstructed view of the tool 30 and valve 55 on the satellite 14, FIG. 3 shows a perspective view of the partially assembled valve tool 30 and FIG. 4 shows the valve tool 30 disassembled. Referring to both FIGS. 3 and 4, the support frame includes a base plate 40 with two long standoffs 50 secured to base 40. A motor frame plate 56 is bolted on top of three spacers 58 which in turn are bolted to base plate 40. The socket module holder mechanism includes socket module holder 60, and a module retaining bar 63.

The socket drive mechanism includes motor-gearbox units 54b, one of the couplings 68, bolts 61, an external gear 70, bearings 72 and 73, and a shaft 106 and a pinion 108. The socket drive mechanism is used to activate the sockets located in a socket module holder 60 and is driven by motor-gearbox unit 54b, which along with motor-gear box unit 54c used to drive a clamp mechanism 77 to be discussed below, are mounted on motor frame plate 56 and the shaft of each motor 54a, 54b and 54c is connected to an associated coupling 68. Three short standoffs 52 are bolted on top of motor frame plate 56. A middle base section 62 is mounted on top of a lower base section 64 and both are bolted together to base plate 40 by bolts 66. A gear 70 is seated in the circular opening in middle base section 62 and the socket module holder 60 is seated in the gear 70 (seen only in FIG. 4). The gear 70 and module holder 60 are supported by an upper ball bearing 72 and a lower ball bearing 73. The upper bearing 72 is supported by the base plate 40. The lower bearing 73 is supported by the middle base section 62.

Figure 4B:
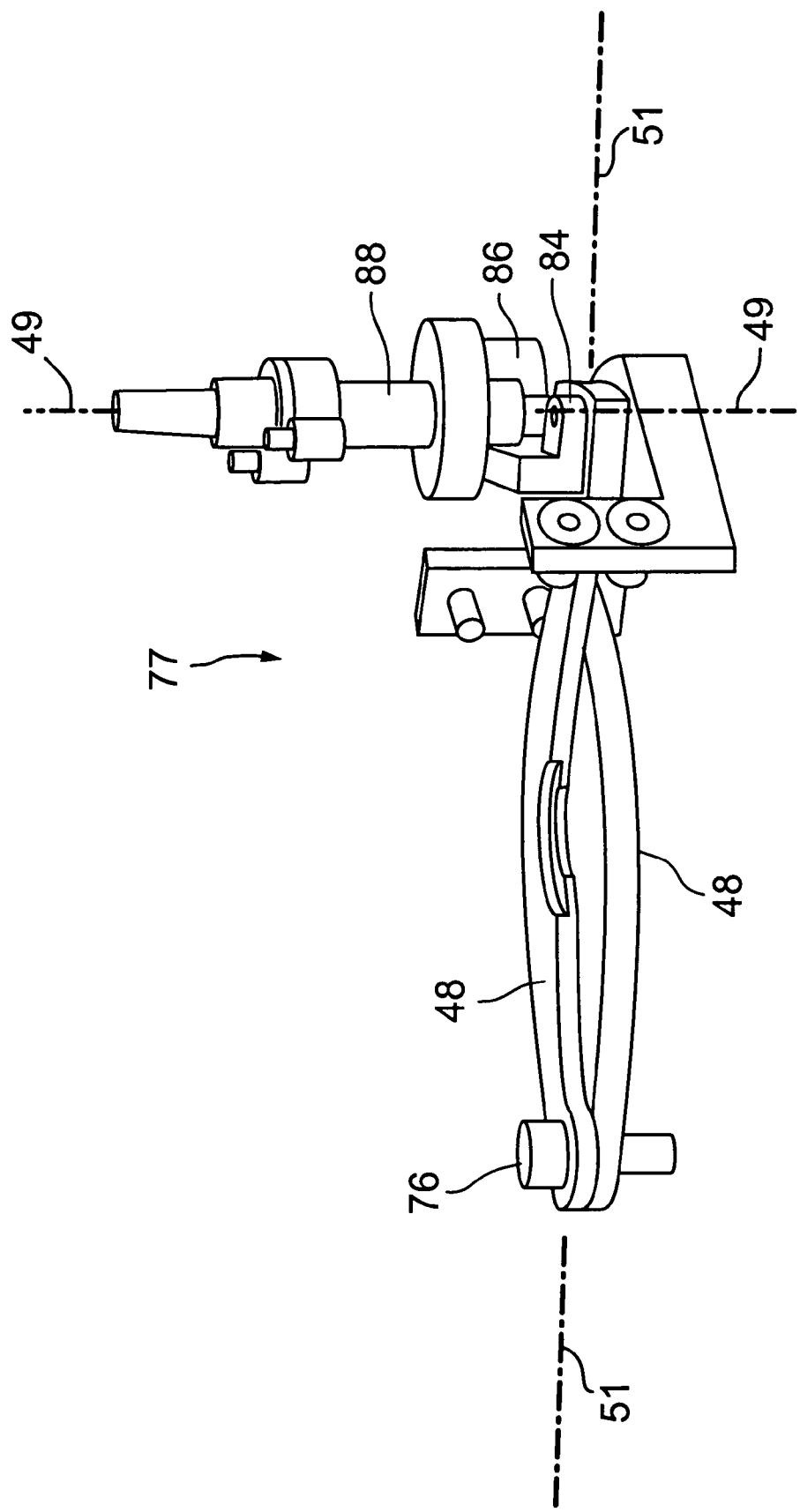
FIG. 4b shows a perspective view of a clamping mechanism forming part of the valve tool.

Referring to FIGS. 4 and 4b, clamping mechanism 77 with two fingers 48 is bolted to middle base section 62 by a bolt 76 and the two fingers pivot about an axis defined by bolt 76. A clamp support 80 is mounted on the side of the middle base section 62. Tool 30 includes two clamp links 84 and 86 pinned to the clamp finger 48 and to the clamp shaft 88 perpendicular to the plane of actuation of the clamp fingers 48 containing axis 51 (FIG. 4b). As motor-gear box unit 54c rotates the clamp-shaft 88 through a half turn about shaft axis 49, the clamp links 84 and 86 either push the ends of the clamp fingers 48 apart, which closes the gripping surfaces on the clamp onto the reaction area of valve 55, or pulls the ends of the clamp fingers 48 together, which opens the clamp sufficiently to allow the valve 55 to pass through. The clamp-shaft 88 is supported on both ends by bushings 90. The top bushing 90 is press-fit in the base plate 40 and bottom bushing 90 is press-fit into the clamp-support 80 which is attached to the middle base section 62.

Figure 4C:
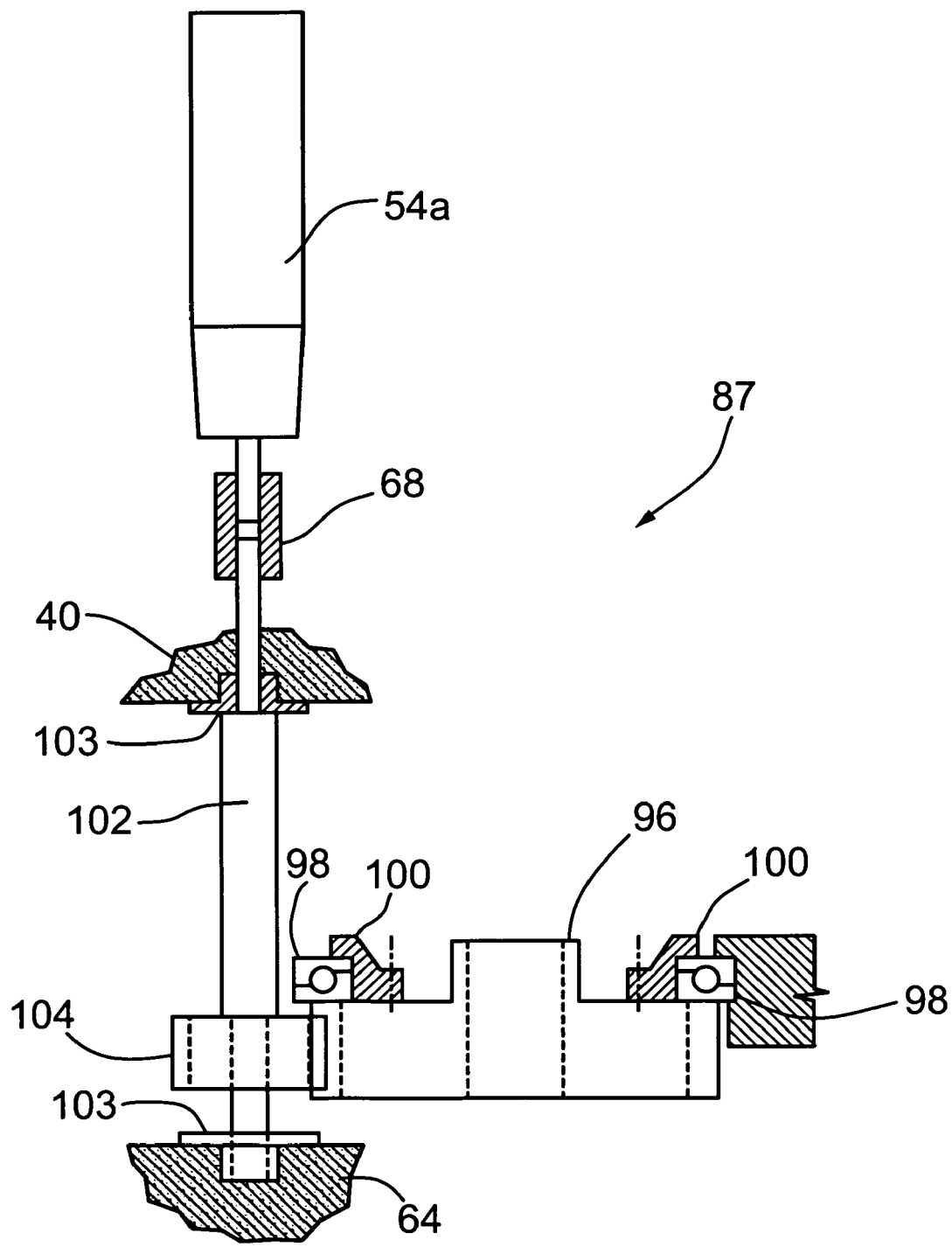
FIG. 4c shows an elevational view of a valve actuation mechanism forming part of the valve tool.
Figure 10:
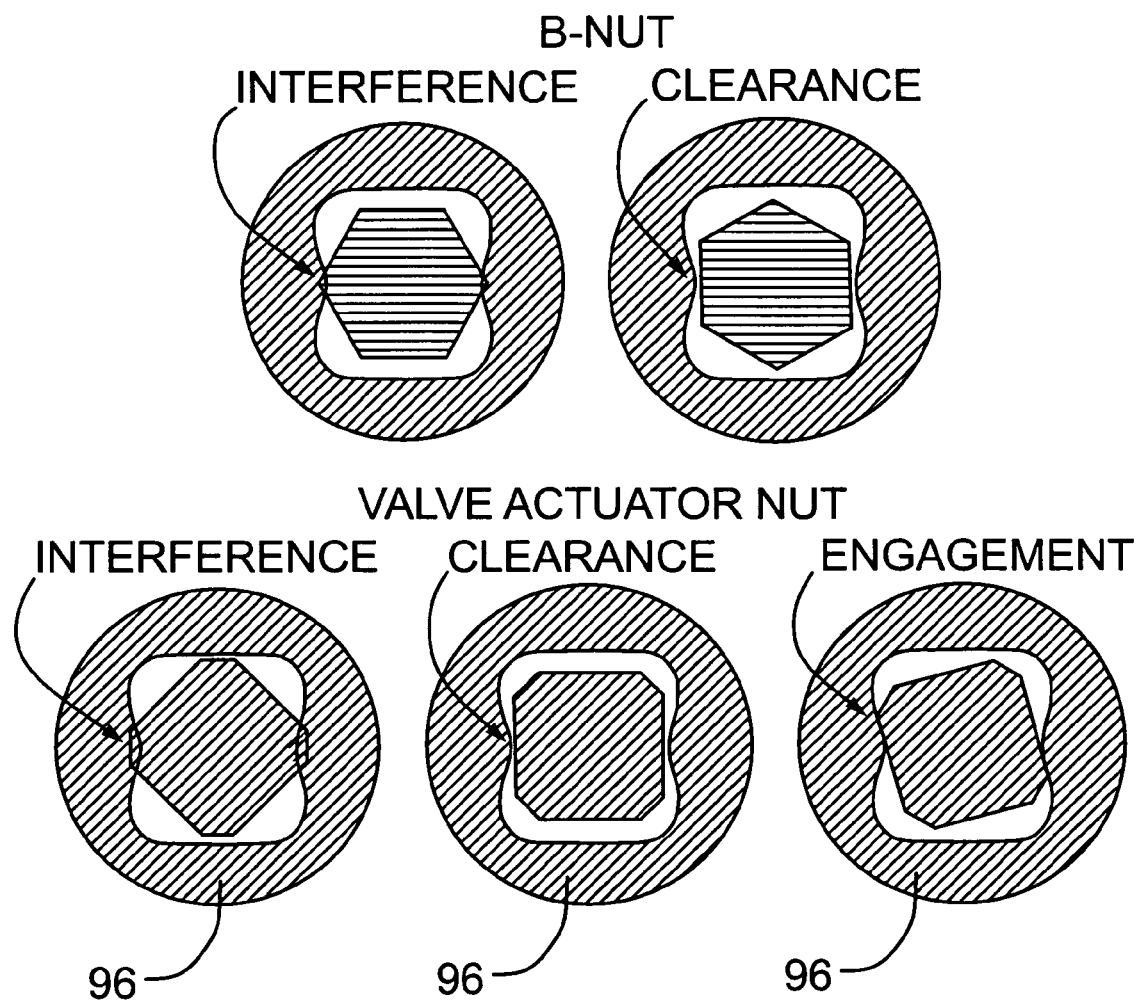
FIG. 10 shows the clearances and interferences between the B-nut and the valve actuator nuts and the valve actuator.

Referring to FIG. 4c, a valve actuation mechanism 87 includes an external gear 96 with an internal wrench profile as shown in FIG. 10. External gear 96 is supported by a bearing 98 and is affixed to that bearing with bearing holder 100. The external gear 96 is driven by a pinion 104 attached to shaft 102. Shaft 102 is coupled to motor gear-box 54a via coupling 68. The ends of shaft 102 are inserted into bushings 103 with the top bushing press-fit into base plate 40 and the bottom end is press fit into base plate 64.

The valve actuation mechanism 87 is driven by motor gearbox 54a. As motor-gearbox 54a rotates, shaft 102 rotates and pinion 104 driving gear 96 which has parallel flats, similar to a wrench, that engage the valve actuation nut of the valve 55. The engagement allows the gear 96 to open and close the valve 55.

Figure 5:
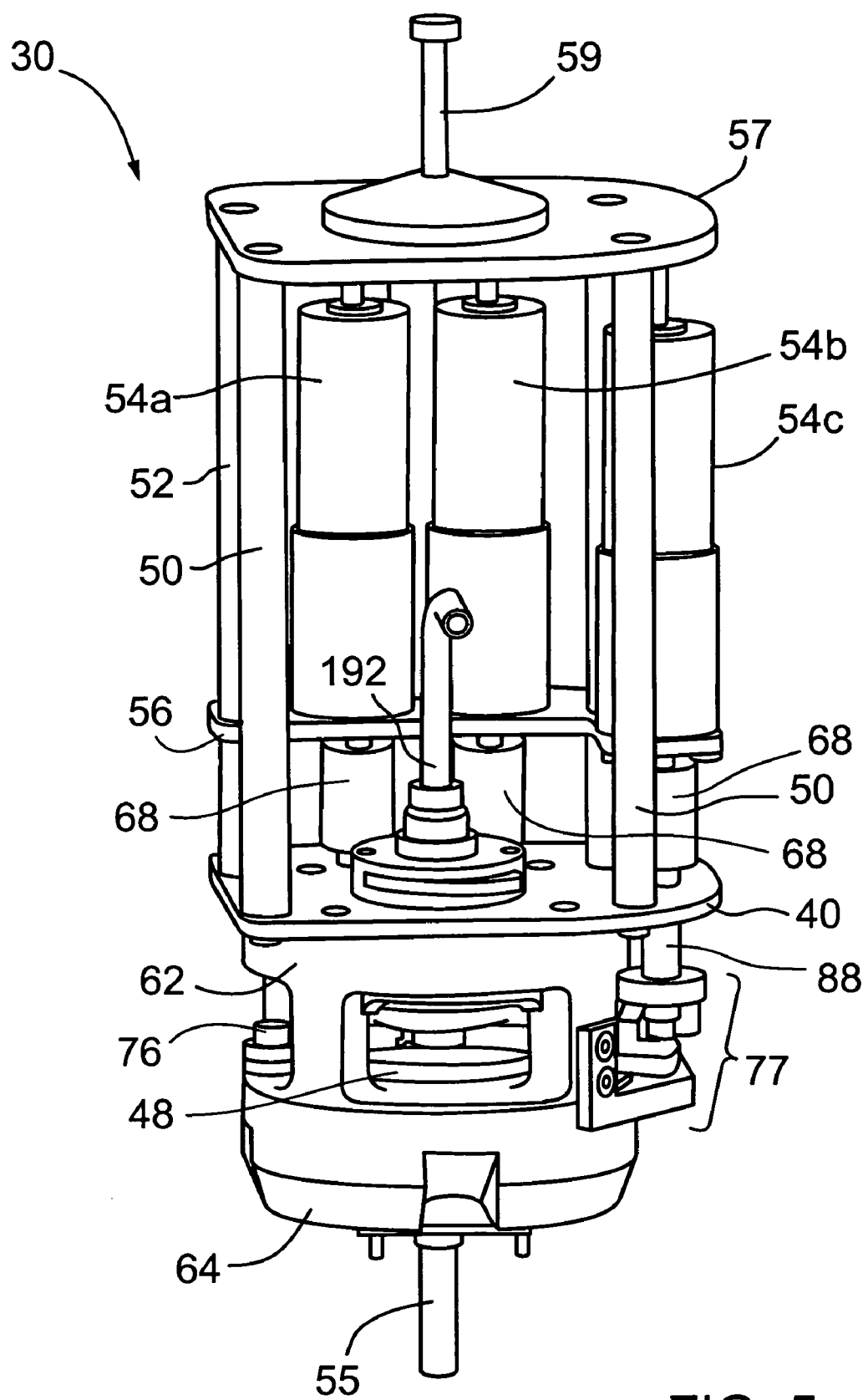
FIG. 5 shows the fully assembled valve tool holding a socket module.

The front view of the fully assembled tool 30 is shown in FIG. 5. The support frame includes a top plate 57 is bolted to the two long standoffs 50 and the three short standoffs 52. A fuel line socket module 192 is shown gripped by tool 30. A grapple fixture 59 is bolted to the top of top plate 57 and is used by end effector 18 to grasp the tool 30. Mounted adjacent to the grapple 59 is an n-pin electrical connector half (not shown). Mounted on the end-effector 18 is a connector mating mechanism (not shown). Once the end-effector 18 completes grappling of the tool 30, the connector mating mechanism extends the opposite half of the electrical connector on to the connector mounted on plate 57, thereby providing power and control signals to the tool.

The base plate 40, middle base section 62 and lower base section 64 form the basic body of the tool 30 supporting all the internal components. The frame includes motor frame plate 56, the short standoffs 52 and the long standoffs 50 and top plate 57. This frame has three functions, i) protect the motors 54a, b and c, ii) provide structure to attach the base (formed by the base plate 40, middle base section 62 and lower base section 64) to the top plate 57, and iii) provide lineup guides (the long standoffs 50) for operations using the caddy shown in FIG. 7 discussed hereinafter.

The three motor-gearbox units 54a, 54b and 54c may be identical, even though they do not need to be. The motors that are used are DC brush motors however it will be understood that DC brushless motors, stepper motors, AC motors, servomotors, or other types of motor could be used. The gearboxes that are used are planetary gearboxes. Other gearboxes such as spur gearboxes could be used. Ideally, but not necessarily, the gearboxes would be backdrivable. If the motors can provide sufficient torque the gearboxes may not be needed at all.

The function of the clamping mechanism 77 is to secure the valve tool 30 to the reaction area of the valve 55, thereby ensuring that any reaction torques from the socket drive mechanism or valve actuator are reacted locally to prevent damage to the valve.

Referring to FIG. 4b, the clamping mechanism 77 is a double four-bar linkage and the four main parts of the linkage are the clamp-shaft 88, the clamp-link 84 or 86, the clamp-fingers 48 and the base of the valve tool 30 formed by middle base section 62 and lower base section 64. The clamp is driven by the gear-motor 54 on the right hand side of the tool shown in FIG. 5. The gear-motor 54c drives the clamp-shaft 88 through its associated flexible coupling 68. The clamp-shaft 88 is the input, and rotates about ½ turn for the clamp to go from open position to closed position. The clamp links 84 and 86 push and pull respectively the clamp-fingers 48 closed or open.

The geometry of the clamp four bar mechanism has been selected so that in the closed position, the clamp has an "over-centre" locking characteristics. The motor-gearbox unit 54c is used to open or close the clamp mechanism, but when the clamp mechanism is in either position, any forces exerted by the valve 55 on the "reaction area" are transferred directly through clamp-shaft 88 and not through the motor 54c. This allows the motor 54c to be significantly smaller and lighter than would the case if the design of the clamp was such that any forces exerted by the valve on the "reaction area" were instead transferred directly through the motor 54c.

The socket module holder 60 mechanism has two functions: 1) to drive the B-nut or fuel-line-nut on or off the valve of the fuel tank on the satellite being refueled; and 2) accept and retain the corresponding modules required for coupling the fluid transfer system to the oxidizer and fuel tanks on the client satellite.

The socket module holder 60 is driven by gear motor 54b in the centre of the group of three motors 54a to 54c in FIG. 5. The centre gear motor 54b drives the shaft 106 through its associated flexible coupling 68 (FIG. 4). The shaft 106 is supported on both ends by bushings 109. The top bushing 109 is press-fit in the base plate 40 and the bottom bushing 109 is press-fit into the middle base section 62.

Referring particularly to FIG. 4, the pinion 108 is attached to the shaft 106 by a radial dowel pin 111. Then pinion 108 drives the gear 70. The gear 70 is attached to the module holder 60 with two screws 61.

The socket module holder 60 is designed to accept and drive the hexagonal B-nut of the valves located on the fuel tank and the oxidizer tank of the satellite being serviced, and to accept and retain the various socket modules. The fuel line and oxidizer line socket 192/194 and socket modules 196/198 (FIG. 3) are contained or held in place with the module retaining bar 63. The module retaining bar 63 rotates about a set-screw 65. The module retaining bar 63 features a detent system that holds the retaining bar 63 in either the "open" or "closed" position. This detent system comprises a ball-detent-spring 67 situated in the module holder 60 that engages two holes in the module retaining bar 63, corresponding to the "open" and "closed" positions, on the B module retaining bar 63. The various sockets are all designed to include a V-groove 79 situated on the circumference of the socket so that when the socket is inserted into the socket module holder 60, retaining bar 63 can be toggled into groove 79, capturing the socket, preventing it from being forced out of the socket module holder 60 during operation.

Figure 6:
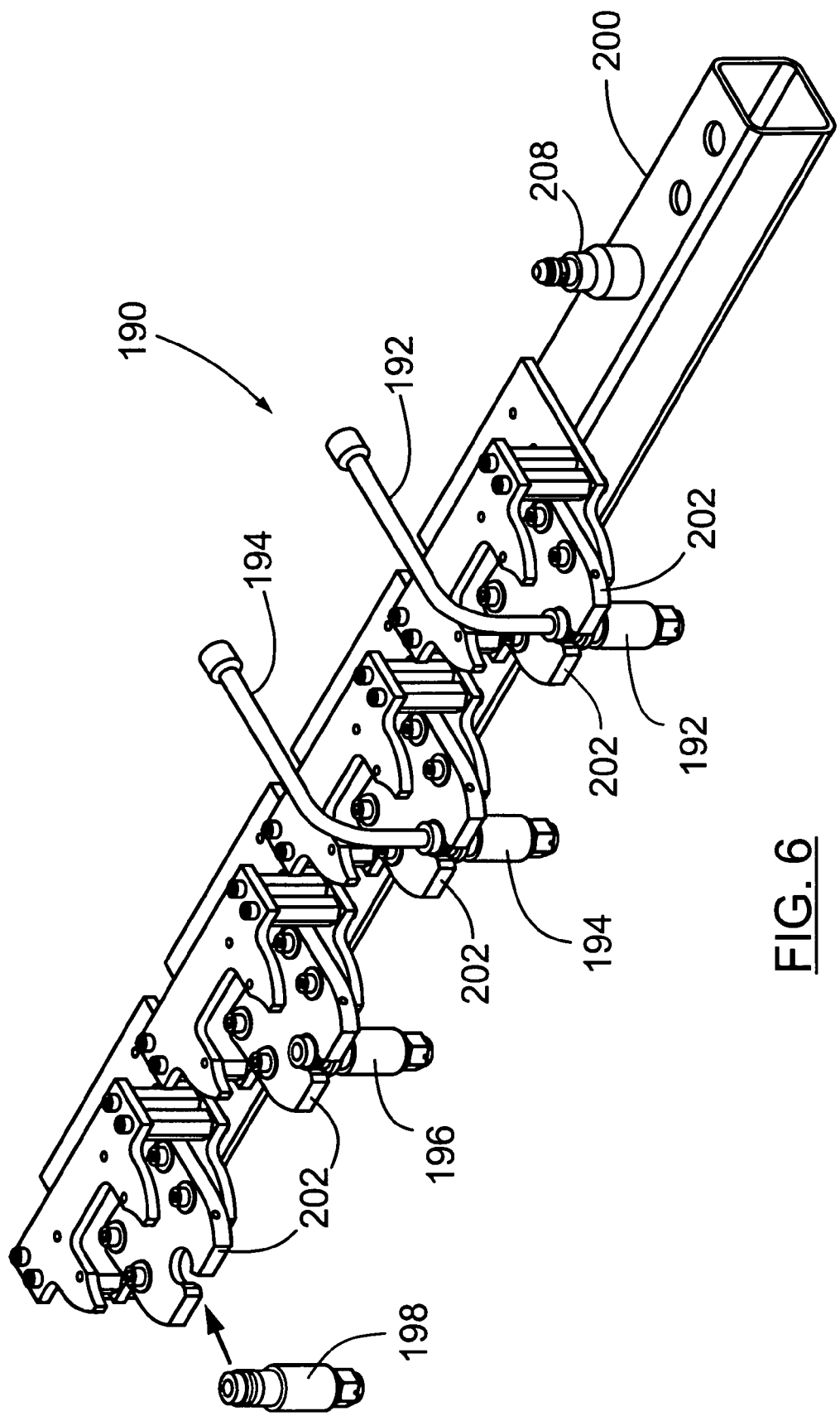
FIG. 6 shows a module caddy on which various refueling and draining connectors are mounted.

FIG. 6 shows a perspective view of the assembled module caddy 190 for holding the different socket modules, one fuel line socket module 192 being for engaging the fuel fill valve 55, thereby coupling the fuel tank on the client satellite to the fuel transfer system on the servicer spacecraft through the tube forming part of the fuel line socket module 192, another oxidizer line socket module 194 being for engaging the oxidizer fill valve thereby coupling the oxidizer tank on the client satellite to the fuel transfer system on the servicer spacecraft through the tube forming part of the oxidizer line socket module 192, and a third socket module 196 being for engaging the valve access cap (B-nut) on the fuel fill valve, and a fourth socket module 198 being for engaging the valve access cap (B-nut) on the oxidizer fill valve. There is also a storage place 208 on rail 200 for the B-nut.

While not shown in FIG. 6, tool caddy 190 includes a holder for valve tool 30, and other tools such as the blanket cutter, outer cap removal and replacement tool and the blanket spreader tool. Thus, initially when the refueling system is deployed, any of the required tools can be attached to the end effector of the positioning mechanism 16, used and then stowed into the storage holder.

FIGS. 7a and 7b shows the module caddy 190 disassembled. Referring to FIGS. 6, 7a and 7b, caddy 190 includes a tubular rail 200 on which four module caddies 202 are mounted. FIG. 7 shows in more detail the components of the caddies 202. Each caddy 202 includes a base plate 206, a socket module retaining plate 210 and a top plate 214. Socket module retaining plate 210 is bolted directly to the base plate 206 by bolts 216 and top plate 214 is spaced above base plate 206 by spacers 218 and bolted to the spacers 218 by bolts 220 while the spacers are bolted to the base plate 206 by bolts 222. The 'V' groove 79 located at the top of socket modules 192, 194, 196 and 198 are configured to mate with a spring ball detent 232 to hold the modules 192, 194, 196 and 198 in place in each of the four socket module holders 202.

The module retaining bar 63 is activated by a tab 234 (shown in FIG. 7b) on the socket module retaining plate 210. When the tool 30 is fully engaged to the module caddy 190, the tab 234 on socket module retaining plate 210 is close to the outer diameter of the module holder 60. The module retaining bar 63 protrudes outside of this diameter. When the motor 54b of the socket drive mechanism is activated the module retaining bar 63 will eventually come in contact with the tab 234 on the socket module retaining plate 210 and be toggled to the opposite position. Driving the socket clockwise will lock the module in the module holder 60, and conversely, driving the socket counter-clockwise will unlock the module.

A second ball-detent-spring in the hex-socket portion of the module holder 60 is used to engage the B-Nut of the valve and hold it in place when it is being transferred from the valve to its storage location 208.

Figure 8A:
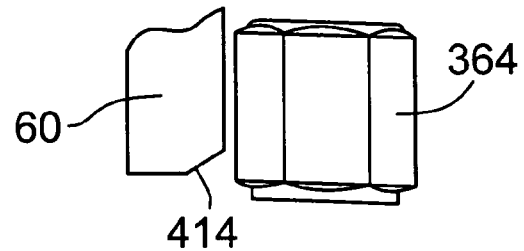
FIG. 8a shows a portion of a valve tool engaging a valve cap on a client satellite.
Figure 8:
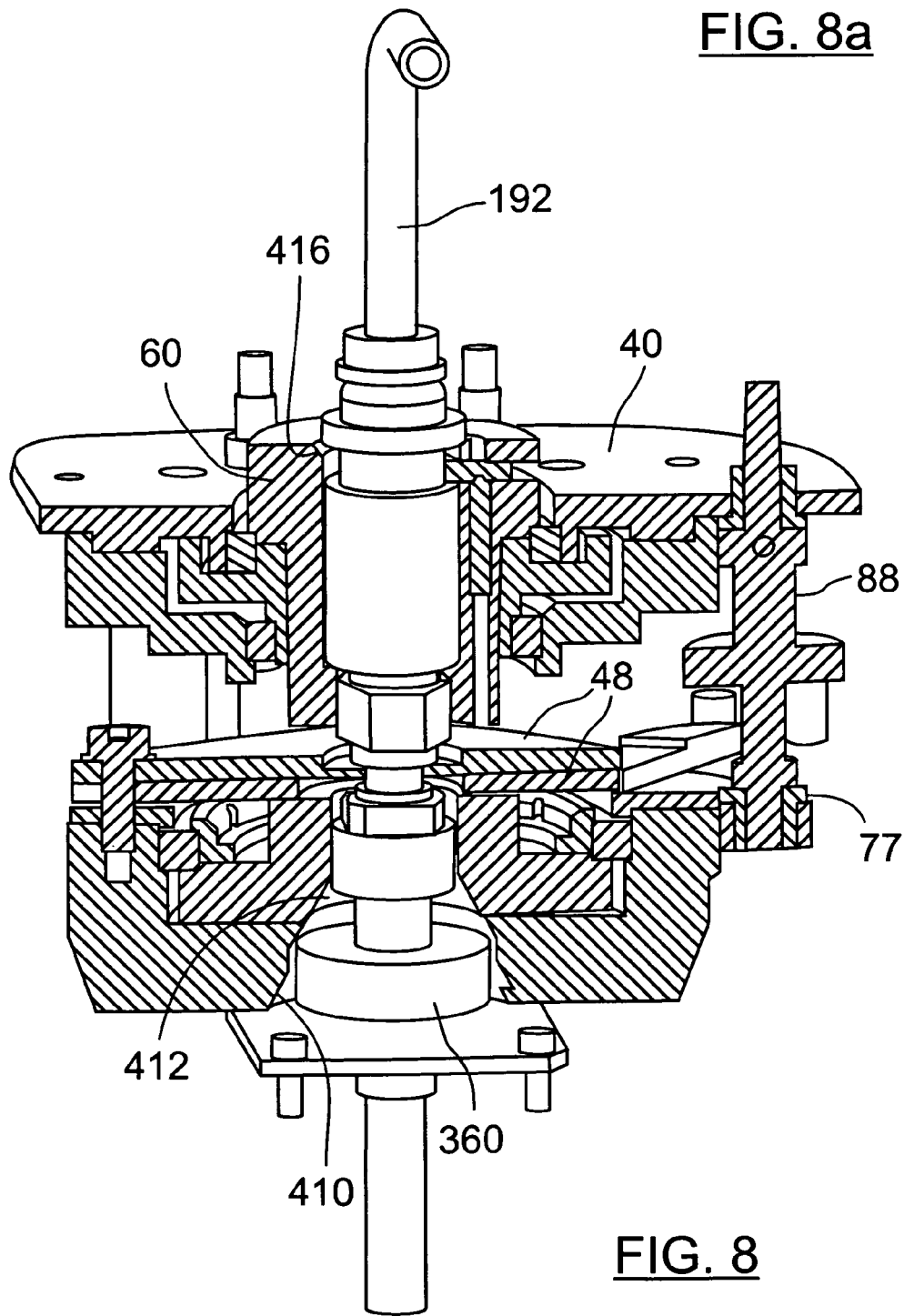
FIG. 8 shows the valve tool forming part of the present invention holding a fuel line coupling and connecting it to a fuel valve.

FIG. 8 shows the refueling system coupled with the fuel valve 55 of the client satellite with valve tool 30 holding a fuel line socket module 192 engaged with valve 55 thereby coupling the fuel line of socket module 192 to the fuel valve 55. This configuration is achieved after the servicer satellite has captured and docked with the client satellite, and the fuelling system on the servicer satellite has been deployed and the access valve caps (B-nuts) on the fuel/oxidizer tanks have been removed using the socket modules 196 and 198, which processes are laid out below in more detail. As can be seen from FIG. 8, the lower base section 64 of the support frame includes a passageway which has dimensions and associated lead-ins 410 to receive therein a portion of the fuel fill valve 55 (and the comparable valve located on the fill port of the oxidizer tank of the client satellite). As mentioned above, several sections of valve tool 30 are designed specifically for robotic teleoperation by providing lead-in features such as the base bottom section 64 which include lead-ins (chamfer) 410. These lead-ins along with the cut-outs 46 enable the bottom section of base bottom section 64 to be mated to the fuel valve 55 thereby coupling the fuel line socket module 192 to the valve 55. The socket module holder 60 is mounted in the mid base section 62 such that when a socket module is located in the module holder 60 a portion of the socket module projects into the passageway to engage the fuel fill valve and said oxidizer fill valve.

Figure 9:
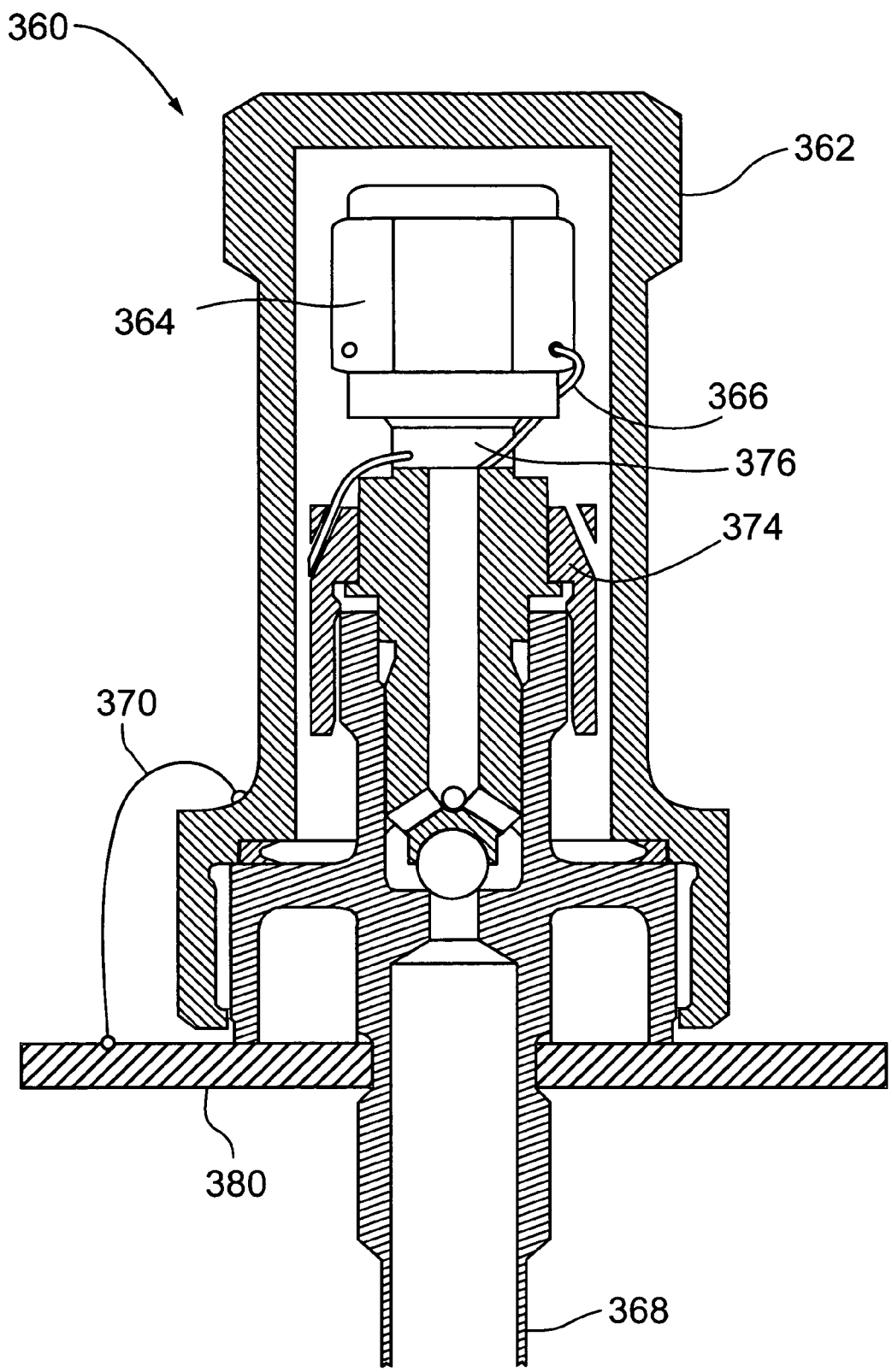
FIG. 9 shows a cross sectional view of a typical fuel fill valve mounted on a satellite to be refueled by the system forming the present invention.

FIG. 9 shows a cross sectional view of a typical fuel fill valve 55 mounted on the client satellite to be refueled by valve tool 30. Valve 55 includes an outer cap 362 and an outer cap lockwire 370 secured to base 380. A B-nut cap 364 is threaded onto the valve stem 368 and a lockwire 366 secures the B-nut cap 364 to the valve stem. An actuation nut 374 is rotated to open or close the valve. The lockwire 372 secures the actuation nut 374 to the valve stem 368.

Referring to FIG. 10, the valve actuator gear 96 is designed to accept and drive the square of the valve actuator of the valve. The "wrench" portion of the valve actuator is configured so that it allows maximum clearance, when passing over the B-nut of the valve, and sufficient contact area to drive the valve actuator of the valve.

Tool 30 is configured with to be able to be used in conjunction with camera views from cameras 26. The openness of the frame and the cutouts in the base allow cameras to see all of the critical phases of the tool operation. There are cutouts 69 in the base middle section 62 and cutouts 46 in the base bottom section 64 (see FIGS. 3 and 5). There are features machined into the following pieces and in the frame design to allow easy interpretation of position with cameras 26: module holder 60, gear 96, module retaining bar 63 and clamp 77.

Several pieces of valve tool 30 and the tool caddy 190 are designed specifically for robotic teleoperation by providing lead-in features. They include the base bottom section 64 which include lead-ins (chamfer) 410 (FIG. 8), gear 96 which include lead-ins (chamfer) 412, module holder 60 which includes lead-ins (chamfer) 414 (FIG. 8a) and (chamfer) 416 (top for modules and bottom for B-Nuts), the tool frame design, the module caddy top plate 214 which includes lead-ins 420, and the module caddy base plate 206 which includes lead-ins 418 (FIGS. 6 and 7).

An embodiment of the system may include a fuel spillage management system. During each connection-disconnection cycle there is a minimal leakage of propellant in the range of 2 cm$^2$. In many cases this spillage will not cause any harm to either the client satellite or the servicing spacecraft, and can be slowly evacuated to space. In other cases, client spacecraft with sensitive elements, such as optics or exposed gears, may necessitate the management of the spilled fuel. Quick disconnect couplings offer a means to minimize the spillage to an acceptable level, but these couplings would have to be installed onto client satellites pre-launch.

Figure 11:
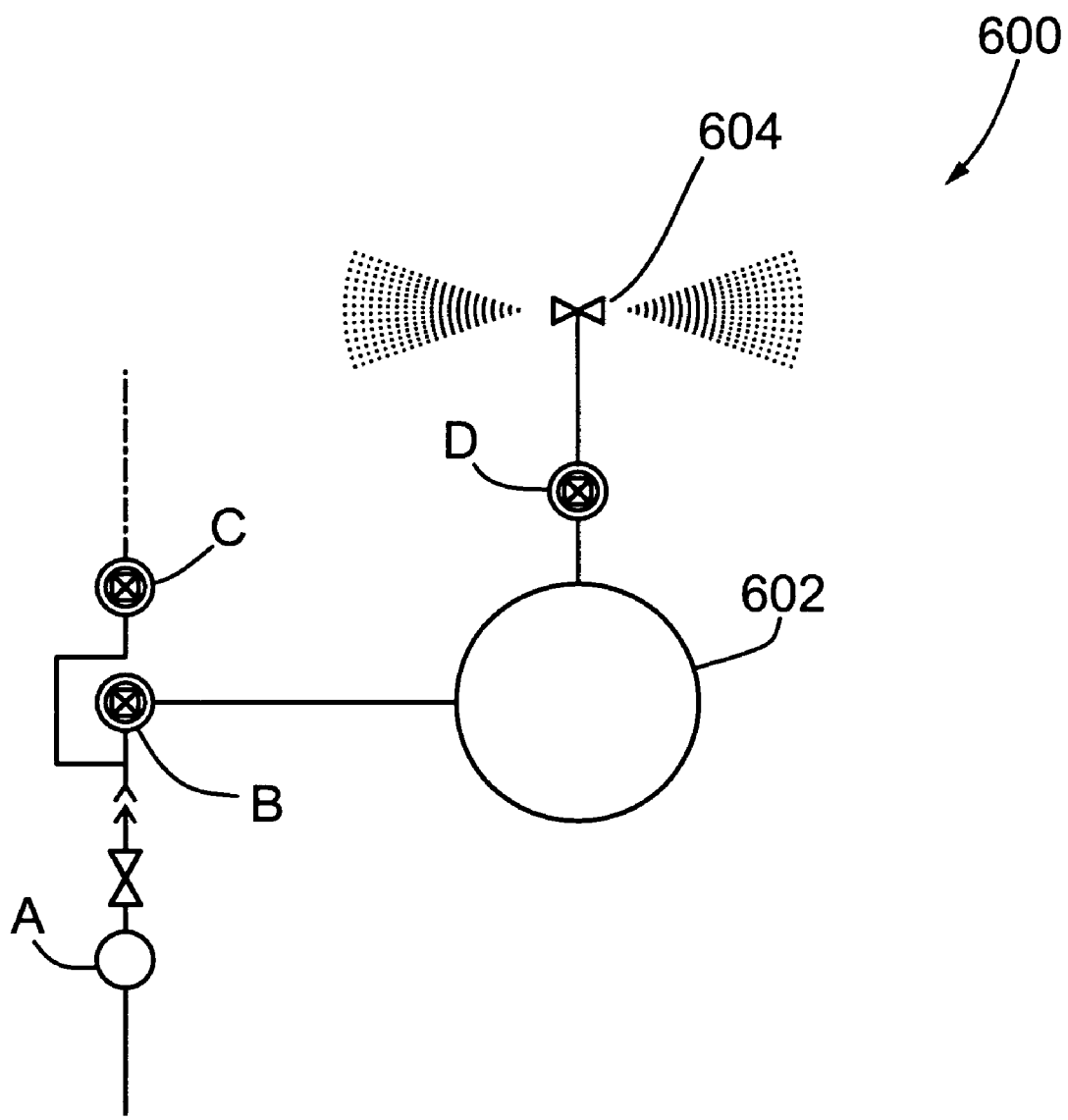
FIG. 11 shows a fuel/oxidizer spillage management system forming part of the present invention.

The spillage management system illustrated generally at 600 in FIG. 11, evacuates the spillage volume into a vacuum plenum 602 located onboard the servicer spacecraft, diluting the spillage, before it is eventually evacuated to space in a controlled manner. Thus, before the servicing tool is separated from the client service valve, the spillage is routed to the vacuum plenum 602 diluting the spilled liquid. More particularly, once the servicing spacecraft has coupled with the client satellite, and the fluid transfer system has been coupled to the fuel tank of the client satellite, in the initial state the valves A, B, C, and D are closed. Valve D is then opened to vent the plenum 602 to vacuum, and once that is complete valve D is closed. Upon completion of the transfer of fuel from the holding tank on the servicer craft to the client satellite fuel tank, any excess fuel in the lines need to be removed. To dilute excess fuel valve B is then opened and fuel remaining in the fuel transfer lines are drawn into plenum 60. The plenum 602 is then pressurized with helium and valve D is then opened to vent the dilute fuel vapor to the zenith side of the servicer craft through vent 604. The vented plume of fuel or oxidizer are directed away from the servicer-client spacecraft stack minimizing the potential for corrosion of sensitive spacecraft components.

Figure 12:
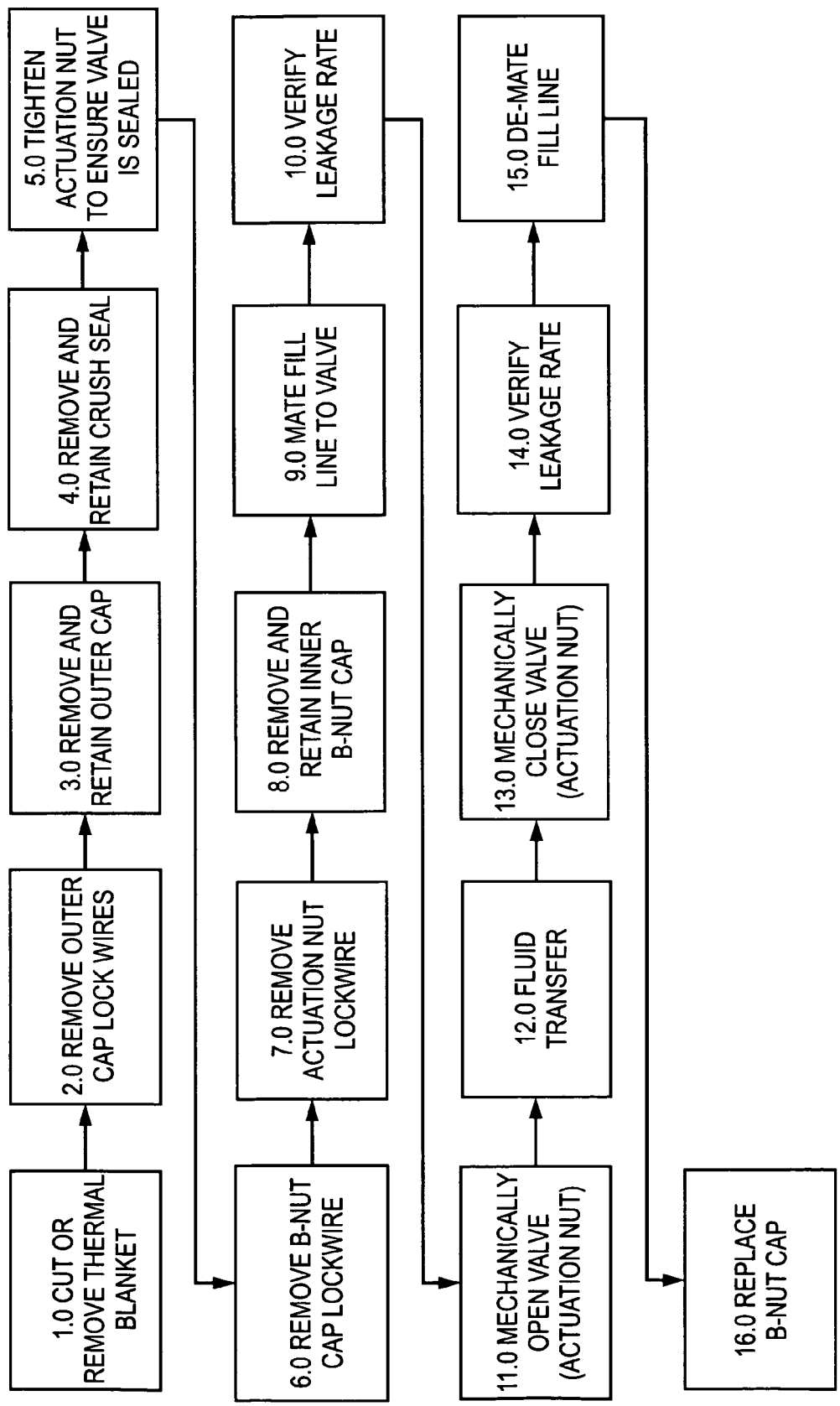
FIG. 12 is a flow diagram showing the steps involved in refueling a satellite using the method and system forming part of the present invention.

FIG. 12 shows a flow diagram of all the steps in refueling the spacecraft. After removal of the thermal blanket, fill valve outer cap and the lockwires have been cut, the valve tool is affixed to the end effector. When the tool is in operation, the operational sequences to "refuel" one of the fuel lines is as follows:
1. Mount B-Nut Module
2. Remove B-Nut
3. Store B-Nut
4. Store B-Nut Module
5. Mount Fuel-line Module
6. Attach Fuel-line
7. Open Valve
8. Refuel . . .
9. Close Valve
10. Detach Fuel-line
11. Store Fuel-line Module
12. Mount B-Nut Module
13. Retrieve B-Nut
14. Replace B-Nut
15. Store B-Nut Module
Operations concluded These tasks are broken down in to detailed steps below.
Note: [Tool] refers to actions that the tool will do.
[Robot] refers to action the robot will do.
Mount B-Nut Module
1. [Robot] Move valve tool 30 close to tool caddy 190 with B-nut module 198
2. [Robot] Set height of valve tool 30 so that tool top plate 57 is above the top of B-nut module 198 and so that the valve tool middle plate 40 is below the bottom of B-nut module 198. A camera view will be used to position the tool 30 relative to the tool caddy 190. (tool change camera)
3. [Robot] Move valve tool 30 towards tool caddy 190 lining-up valve tool posts 50 onto tool caddy guides 214. Ensure posts 50 are touching guides 214 lightly.
4. [Tool] Activate valve tool B-nut actuator 54b to set module retaining bar 63 away from tool caddy 190.
5. [Robot] Move valve tool 30 up until valve tool middle plate 40 touches tool caddy bottom tab 234 socket module retaining plate 210.
6. [Tool] Activate valve tool B-Nut Actuator 54b in "Lock" direction until Locking Mechanism is engaged (approximately ½ turn)
7. [Robot] Move valve tool 30 down until B-Nut Module 198 (now attached to valve tool 30) is below the bottom of the tool caddy 190

Remove B-Nut
Assume B-Nut Module is mounted
1. [Robot] Move Tool 30 close above Valve 360. This can be accomplished by moving the robot to a pre-programmed position.
2. [Robot] Align centre of Tool 30 with Valve. The alignment can be achieved using two orthogonal camera views. (alignments cameras)
3. [Robot] Align Tool with reaction area 376 flats on Valve. This alignment is achieved by rotating the tool 30 about its long axis until the rectangular plate 372 to which the valve is mounted, appears square in both alignment camera views.
4. [Tool] Ensure Clamp 77 is Open
5. [Robot] Seat the tool 30 down onto the valve 360. Two approaches will work to accomplish this:
6. Approach 1: Pre-align the contact surfaces of the tool to match the corresponding surfaces of the valve using camera views that have a clear view of the tool contact surfaces, as follows:
   a. [Robot] Align Tool 30 with reaction area 376 flats on Valve 360
   b. [Tool] Align hex on B-Nut Actuator 60 with B-Nut 364 on Valve 360
   c. [Tool] Align Valve-Actuator 96 flats on Tool 30 with flats for valve-actuator 374 on Valve
   d. [Robot] Move Tool 30 down until Tool is seated completely.
7. Approach 2: Slide the tool 30 down over the valve 360 until it gets stuck on a valve feature. The tool will get stuck if the B-nut socket is not aligned with the B-nut 364 or the Valve-Actuator 96 flats on the tool is not aligned with the valve actuator 374 on the valve. Fiducial marks on the alignment camera view will indicate which feature is not aligned. The tool may get stuck on both, none, or one of the features.
   a. Slide the tool 30 down over the valve until the B-nut actuator 60 on the tool gets stuck on the B-Nut 364.
   b. Slowly tighten the B-nut actuator 60 until the tool becomes unstuck.
   c. If the tool now gets stuck on the valve actuator 374, slowly tighten the valve actuation wrench 96 on the tool 30 until it becomes unstuck.
8. [Tool] Close Clamp 77
9. [Tool] Activate Valve-Actuator 96 in "Tightening" direction
10. [Tool] Activate B-Nut Actuator 60 in "Loosening" direction until B-Nut is fully un-threaded. (approx 5 revolutions)
11. [Robot] Exert downward force.
12. [Tool] Open Clamp 77
13. [Robot] Move Tool 30 up until clear of Valve 360
14. [Robot] Move Tool 30 away from Valve 360
15. Ready to proceed with next task Store B-Nut
Assume B-Nut Module 90 is mounted and B-Nut 364 is in Tool
1. [Robot] Move Tool 30 close above B-Nut Storage Post 208. This can be accomplished commanding the robot to move to a pre-programmed position.
2. [Robot] Align centre of Tool 30 with B-Nut Storage Post 208 using the tool change camera.
3. [Robot] Align Tool 30 with reaction area flats on 208 B-Nut Storage Post
4. [Tool] Ensure Clamp 77 is Open
5. [Robot] Move Tool down until Tool is seated completely
6. [Tool] Close Clamp 77
7. [Tool] Activate B-Nut Actuator 66 in "Tightening" direction until B-Nut 364 is fully threaded. (approx 5 revolutions).
8. [Tool] Align Valve-Actuator flats 96 with flats on B-Nut 364
9. [Tool] Open Clamp 77
10. [Robot] Move Tool 30 up until clear of B-Nut Storage Post 208.
11. [Robot] Move Tool 30 away from B-Nut Storage Post 208
12. Ready to proceed with next task Store B-Nut Module
Assume B-Nut 364 is not in Tool 30
1. [Robot] Move Tool 30 close to Caddy 202
2. [Robot] Set Tool 30 height so that Tool top plate 57 is above Caddy top and so that the B-Nut Module top 198 is below Caddy bottom 206
3. [Robot] Move Tool 30 towards Caddy 202 lining-up Tool posts 50 onto Caddy guides #7 and #8. Ensure posts are touching guides lightly
4. [Tool] Activate Tool B-Nut Actuator 54b to set Locking Mechanism away from Caddy 202.
5. [Robot] Move Tool up 30 until Tool middle plate 40 touches Caddy bottom tab 234
6. [Tool] Activate Tool B-Nut Actuator 54b in "Unlock" direction until Locking Mechanism is disengaged (1 turn)
7. [Robot] Move Tool down until Tool middle plate 40 is below bottom of B-Nut Module 198
8. [Robot] Move Tool 30 directly away from Caddy 202
9. Ready to proceed with next task Mount Fuel-line Module
Assume there are no modules in Tool
1. [Robot] Move Tool 30 close to Caddy with Fuel-line Module
2. [Robot] Set Tool height so that Tool top plate 57 is above the top of Fuel-line Socket Module 192 and so that Tool middle plate 40 is below the bottom of Fuel-line Socket Module 192
3. [Robot] Move Tool 30 towards Caddy 202 lining-up Tool posts 50 onto Caddy guides #7, #8. Ensure posts are touching guides #7,#8 lightly
4. [Tool] Activate Tool B-Nut Actuator 54b to set Locking Mechanism 63 away from Caddy 202.
5. [Tool] Align hex of B-Nut Actuator 54b with hex of Fuel-line Socket Module fitting 192
6. [Robot] Move Tool 30 up until Tool Middle plate 40 touches Caddy bottom tab 234.
7. [Tool] Activate Tool B-Nut Actuator 54b in "Lock" direction until Locking Mechanism is engaged (approximately 1 turn)
8. [Robot] Move Tool 30 down until Fuel-line Socket Module 192 (now attached to Tool) is below Caddy bottom 206.
9. [Robot] Move Tool 30 directly away from Caddy 202
10. Ready to proceed with next task Attach Fuel-line
Assume Fuel-line Module 192 is mounted. The use of the camera 26 views described for the removal of the B-Nut operation, will be used for this operation, but is not described here.

1. [Robot] Move Tool 30 close above Valve 360
2. [Robot] Align centre of Tool 30 with Valve 360
3. [Robot] Align Tool 30 with reaction area flats 376 on Valve
4. [Tool] Ensure Clamp 77 is Open
5. [Tool] Align Valve-Actuator 96 flats on Tool with flats for valve-actuator 374 on Valve 360
6. [Robot] Move Tool 30 down until Tool 30 is seated completely.
7. [Tool] Close Clamp 77
8. Ready to proceed with opening valve Open Valve Assume Fuel-line 192 has been attached to Valve 360 (and therefore Tool 30 is still on Valve 360)
1. [Tool] Ensure Clamp 77 is closed
2. [Tool] Activate Valve Actuator 54a in "Loosening" direction until valve-actuator 96 has opened 1 revolution (=approx 5 revolution of coupling 68).
3. Ready to proceed with refueling Refuel
Activate Refueling system.
Close Valve
Assume refueling has been completed
1. [Tool] Ensure Clamp 77 is closed
2. [Tool] Activate Valve Actuator 54a in "Tightening" direction until valve actuator 96 is fully closed. (approx 1 revolution of valve actuator or 5 revolutions of coupling 68).
3. [Tool] Activate Valve Actuator 54a in "Loosening" direction a small step to relieve the force on the valve actuator 96.
4. Ready to proceed with detaching fuel-line Detach Fuel-line
Assume Valve 360 has been closed
1. [Tool] Activate B-Nut Actuator 54b in "Loosening" direction until B-Nut 364 of Fuel-line is fully un-threaded. (approx 5 revolutions)
2. [Robot] Exert downward force.
3. [Tool] Open Clamp 77
4. [Robot] Move Tool 30 up until clear of Valve 360
5. [Robot] Move Tool 30 away from Valve 360
6. Ready to proceed to next task Store Fuel-line Module
1. [Robot] Move Tool 30 close to Caddy 202
2. [Robot] Set Tool height so that Tool top plate 57 is above Caddy top 214 and so that the Fuel-line Module 192 top is below Caddy bottom 206.
3. [Robot] Move Tool 30 towards Caddy 202 lining-up Tool posts 50 onto Caddy guides #7 and #8. Ensure posts are touching guides lightly
4. [Tool] Activate Tool B-Nut Actuator 54b to set Locking Mechanism 63 away from Caddy.
5. [Robot] Move Tool 30 up until Tool middle plate 40 touches Caddy bottom tab 234
6. [Tool] Activate Tool B-Nut Actuator 54b in "Unlock" direction until Locking Mechanism 63 is disengaged (1 turn)
7. [Robot] Move Tool 30 down until Tool middle plate 40 is below bottom of Fuel-line Module 192
8. [Robot] Move Tool 30 directly away from Caddy 202
9. Ready to proceed to next task Mount B-Nut Module
(as described above)
Retrieve B-Nut
1. [Robot] Move Tool 30 close above B-Nut Storage Post 208
2. [Robot] Align centre of Tool 30 with Storage Post 208
3. [Robot] Align Tool 30 with reaction area flats on B-Nut Storage Post 208
4. [Tool] Ensure Clamp 77 is Open
5. [Tool] Align hex on B-Nut Actuator 60 with B-Nut 364 on Storage Post 208
6. [Robot] Move Tool 30 down until Tool 30 is seated properly.
7. [Tool] Close Clamp 77
8. [Tool] Activate B-Nut Actuator 60 in "Loosening" direction until B-Nut is fully un-threaded. (approx 5 revolutions)
9. [Tool] Open Clamp 77
10. [Robot] Move Tool 30 up until clear of B-Nut Storage Post 208
11. [Robot] Move Tool 30 away from B-Nut Storage Post 208
12. Ready to proceed with next task Replace B-Nut
Assume B-Nut Module 198 is mounted and B-Nut 364 has been retrieved.
1. [Robot] Move Tool 30 close above Valve 360
2. [Robot] Align centre of Tool 30 with Valve 360
3. [Robot] Align Tool 30 with reaction area flats on Valve 376
4. [Tool] Ensure Clamp 77 is Open
7. [Tool] Align hex on Valve Actuator 96 flats on Tool with flats for Valve Actuator 374 on valve.
8. [Robot] Move Tool 30 down until Tool is seated completely
5. [Tool] Close Clamp 77
6. [Tool] Activate B-Nut Actuator 54b in "Tightening" direction until B-Nut 364 is fully threaded. (approx 5 revolutions).
7. [Tool] Align Valve-Actuator 96 flats with flats on B-Nut 364
8. [Tool] Open Clamp 77
9. [Robot] Move Tool 30 up until clear of Valve 360.
10. [Robot] Move Tool 30 away from Valve 360
11. Ready to proceed with next task Store B-Nut Module
(as described above)

The system for refueling satellites disclosed herein may include a dedicated refueling satellite launched directly from earth on which the refueling apparatus including the tool caddy, robotic arm and various tools are mounted. Such a dedicated satellite may include a spacecraft docking mechanism such as that disclosed in U.S. Pat. No. 6,969,030 issued Nov. 29, 2005, which patent is incorporated herein in its entirety by reference. The apparatus may be retrofitted onto any suitable satellite. The refueling satellite with the refueling apparatus mounted thereon could be carried on a larger "mother ship" and launched from there or stored on an orbiting space station and launched from there when needed. The system is under teleoperation by a remotely located operator, for example located on earth, in the "mother ship" or in an orbiting space station.

While the system disclosed herein has been described as a remote fuelling system for refueling satellites in orbit once the fuel has been depleted, it will be understood the present system may also be used for safely fuelling satellites prior to being launched into space. In this context, no direct human contact is needed during the fuelling procedure since the whole process can be remotely controlled from a safe distance. In this situation the fuelling is done prior to sealing the thermal blankets and wiring the valves with the various lock-wires so these would not have to be cut off.

As used herein, the terms "comprises", "comprising", "including" and "includes" are to be construed as being inclusive and open-ended. Specifically, when used in this document, the terms "comprises", "comprising", "including", "includes" and variations thereof, mean the specified features, steps or components are included in the described invention. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A system mounted on a servicing spacecraft for transferring fluid to a client satellite, the client satellite including a tank and a fluid port, the tank being coupled to the fluid port, the fluid port including a fluid valve having a valve actuation nut for opening and closing the fluid valve and an access valve cap on the fluid valve, comprising:
    fluid transfer means for transferring a fluid from a fluid tank on the servicing spacecraft to the tank on the client satellite, wherein the fluid is selected from the group consisting of fuel and oxidizer;
    tool means for removing and replacing the access valve cap, for coupling a fluid line to the fluid port and decoupling therefrom, and for actuating the valve actuation nut to open and close the fluid valve;
    sensing means for determining a relative displacement between said tool means and the fluid port;
    positioning means connected to said tool means, for positioning said tool means with respect to the fluid port; and
    control means in communication with said sensing means, said positioning means, and said tool means, for controlling operation of said positioning means and said tool means based on feedback from said sensing means.

2. The system according to claim 1 wherein the servicing spacecraft further includes docking means for docking to the client satellite, said docking means being spatially separated and functionally independent to said tool means; wherein in operation, the servicing spacecraft docks to the client satellite prior to coupling said fluid line to the fluid port.

3. The system according to claim 1 wherein said control means includes a mixed autonomous/teleoperation control system including:
    a computer controller programmed to operate some or all of the fluid transferring operations, and a teleoperation system configured to have a human teleoperator remotely operate some or all of the system through a user interface, and wherein said mixed autonomous/teleoperation control system is configured to work in any one of three modes, including a first autonomous mode in which said computer controller controls all fluid transferring operations, a second teleoperation mode in which said human teleoperator remotely operates the system through a user interface to control all fluid transferring operations, and a third supervised autonomy mode in which the system is autonomously operated but all autonomous operations are monitored, can be halted and must be approved by a human operator.

4. The system according to claim 1 wherein said sensing means is at least one video camera positioned to view said tool means.

5. The system according to claim 1 wherein said sensing means is an artificial vision system.

6. The system according to claim 1 wherein said tool means also includes a blanket cutter for cutting any thermal blankets enveloping the access valve cap, a blanket spreader tool for spreading the cut thermal blanket to allow access to the fluid valve.

7. The system according to claim 1 wherein said tool means also includes an outer cap removal and replacement tool for removing and replacing any protective outer caps located on the fluid valve.

8. The system according to claim 1 wherein said positioning means connected to said tool means is a robotic arm having an end-effector attached at one end thereof, and another end of said robotic arm being attached to the servicing spacecraft, said tool means including a support frame and a grapple fixture bolted to said support frame, said end-effector being configured to grasp said grapple fixture.

9. The system according to claim 1, wherein the access valve cap is a B-nut.

10. The system according to claim 1 wherein said fluid line is a fluid fill line, and wherein the fluid valve is a fluid fill valve.

11. The system according to claim 1 wherein the fluid is a mono-propellant and wherein the client satellite is a mono-propellant propulsion system satellite.

12. The system according to claim 1 wherein said control means includes a teleoperation system configured for remote operation with a human teleoperator issuing commands via a user interface.

13. The system according to claim 12 wherein said human teleoperator is located either on another spacecraft, or located on Earth.

14. The system according to claim 1 wherein said control means is an autonomous control system including a computer controller programmed to operate all fluid transferring operations.

15. The system according to claim 14 wherein said computer controller is mounted on the servicing spacecraft.

16. The system according to claim 14 wherein said computer controller is remotely located from the servicing spacecraft on either another spacecraft or located on Earth.

17. The system according to claim 1 wherein said tool means includes a valve tool and a tool caddy which is mountable on the servicing spacecraft, said tool caddy including storage positions for storing and holding said valve tool and the access valve cap during fluid transferring operations, said tool caddy including a quick release mechanism for holding said valve tool and the access valve cap.

18. The system according to claim 17 wherein said sensing means includes at least two video cameras configured to view said tool caddy wherein images from said at least two video cameras are used to position an end effector on said positioning means relative to said tool caddy.

19. The system according to claim 17, wherein said tool caddy further includes storage positions for storing and holding a blanket cutter, a blanket spreader, an outer cap removal and replacement tool.

20. The system according to claim 1 wherein the system further includes second fluid transfer means for transferring a second fluid from a second fluid tank on the servicing spacecraft to a second tank on the client satellite, the second tank on the client satellite being coupled to a second fluid port, and wherein the second fluid is selected from the group consisting of fuel and oxidizer;
    wherein said tool means is capable of attaching a second fluid line to said second fluid port and decoupling said second fluid line therefrom;

wherein said second fluid port includes a second fluid valve and a second valve actuation nut on said second fluid valve for opening and closing said second fluid valve and a second access valve cap on said second fluid valve; and wherein said tool means includes means for removing and replacing said second access valve cap, and means for engaging said second fluid valve for coupling said second fluid line to said second fluid port.

21. The system according to claim 20 wherein the fluid is fuel and the second fluid is oxidizer.

22. The system according to claim 20 wherein the client satellite is a bi-propellant propulsion system satellite.

23. The system according to claim 20 wherein said tool means includes a valve tool having interchangeable tool modules, said interchangeable tool modules including: at least one first tool module for removing and replacing the access valve cap and said second access valve cap, and at least one second tool module for engaging the fluid valve for coupling said fluid line to the fluid port and for engaging said second fluid valve for coupling said second fluid line to said second fluid port, and wherein said second access valve cap is a B-Nut.

24. The system according to claim 20 wherein said tool means includes a valve tool having interchangeable tool modules, said interchangeable tool modules including: a first tool module for removing and replacing the access valve cap, a second tool module for removing and replacing and said second access valve cap, and a third tool module for engaging the fluid valve for coupling said fluid line to the fluid port, and a fourth tool module for engaging said second fluid valve for coupling said second fluid line to said second fluid port, wherein the access valve cap is a B-nut, and wherein said second access valve cap is a B-Nut.

25. The system according to claim 1 wherein said tool means includes a valve tool having interchangeable tool modules, said interchangeable tool modules including: at least one first tool module for removing and replacing the access valve cap, and at least one second tool module for engaging fuel fill fluid valve for coupling said fluid line to the fluid port, and a third tool module for actuating the valve actuation nut.

26. The system according to claim 25 wherein said valve tool includes a support frame and a tool module holder mechanism mounted on said support frame configured to accept said interchangeable tool modules, and wherein said valve tool includes a tool drive mechanism mounted on said support frame for actuating said interchangeable tool modules when seated in said tool module holder mechanism, and wherein said valve tool includes a clamping mechanism mounted on said support frame to secure said valve tool to a reaction area on the fluid valve, said clamping mechanism being configured to localize torque generated by said valve tool for ensuring that any reaction torques from said tool drive mechanism are reacted locally to prevent damage to the fluid valve.

27. The system according to claim 26 including at least two alignment cameras mounted to provide at least two orthogonal camera views for aligning a centre of said valve tool with the fluid valve and providing views of contact surfaces located on said valve tool.

28. The system according to claim 26 wherein said clamping mechanism is a double four-bar linkage having an elongate clamp-shaft, a first and second clamp-link each connected to said clamp-shaft, two clamp-fingers pivotally connected together at first ends thereof and a second end of one clamp-finger being connected to said first clamp-link, and a second end of said other clamp-finger being connected to said second clamp-link, including a gear-motor connected to an end of said clamp-shaft through a flexible coupling for rotating said clamp-shaft about a drive axis of said clamp-shaft, wherein when said gear-motor is actuated, said clamp-shaft rotates for said clamping mechanism to go from open position to closed position, and wherein said first and second clamp-link push and pull respectively said two clamp-fingers closed or open in a plane substantially perpendicular to said drive axis, wherein said two clamp-fingers have opposed surfaces for gripping a fluid fill valve stem, and wherein the geometry of said four-bar linkage is selected so that in a fully closed position, said first and second clamp-link are over the centre of said drive axis.

29. The system according to claim 26 wherein said support frame includes a lower base section, a mid base section and an upper base section, said lower base section having a passageway and associated lead-ins configured to receive therein a portion of the fluid valve, and wherein said tool module holder mechanism is mounted in said mid base section such that when one of said interchangeable tool modules is located in said tool module holder mechanism, a portion of said one of said interchangeable tool modules projects into said passageway to engage the fluid value.

30. The system according to claim 29 wherein said passageway includes a chamfered portion spaced from said lead-ins having dimensions such that during insertion of the fluid valve, said chamfered portion in combination with said lead-ins aid in insertion of the fluid valve and prevent jamming of same.

31. The system according to claim 26 wherein said tool means includes a tool caddy which is mountable on the servicing spacecraft, said tool caddy including storage stations for storing and holding said at least one first tool module and said at least one second tool module; wherein said storage stations each include a tool module retaining plate and a tab mounted thereon, and wherein said tool module retaining plate includes a spring ball detent; wherein each of said at least one first tool module and each of said at least one second tool module include a groove extending around a periphery thereof; and wherein said groove on each tool module is configured to mate with said spring ball detent to hold said tool module in place in each of said storage stations.

32. The system according to claim 31 wherein said tool module holder mechanism includes a tool module holder and a module retaining bar rotationally mounted to said tool module holder, and wherein said module retaining bar includes a detent mechanism that holds said module retaining bar in either an "open" or "closed" position, and wherein said groove in said at least one first tool module and said at least one second tool module each have a size sufficient to receive therein said module retaining bar, and wherein when said valve tool is fully engaged to said tool caddy said module retaining bar is activated by said tab on said tool module retaining plate, and wherein said tab has a portion with a diameter slightly larger than an outer diameter of said tool module holder, and wherein when said valve tool is fully engaged to said tool caddy for either retrieving a given tool module from one of said storage station stations or returning said given tool module to one of said storage stations, said module retaining bar protrudes outside of this diameter of said tab, and when said tool drive mechanism is activated said module retaining bar will eventually come in contact with said tab on said tool module retaining plate and be toggled to the opposite position, and wherein driving said tool module in one direction will lock said tool module in said tool module holder, and conversely, driving said tool module in the opposite direction will unlock said tool module.

33. The system according to claim 26 wherein said tool means includes a blanket cutter for cutting any thermal blankets enveloping the access valve cap, a blanket spreader tool for spreading the cut thermal blanket to allow access to the fluid valve, and an outer cap removal and replacement tool for removing and replacing any protective outer caps located on the fluid valve.

34. The system according to claim 33 wherein said tool means includes a tool caddy which is mountable on the servicing spacecraft, said tool caddy including storage stations for storing and holding said valve tool, said blanket cutter, said blanket spreader tool, said outer cap removal and replacement tool, said at least one first tool module, said at least one second tool module, and the access valve cap during fluid transferring operations, said tool caddy including quick release mechanism for holding said interchangeable tool modules and the access valve cap.

35. The system according to claim 34 wherein said sensing means is configured to view said tool caddy wherein images from said sensing means are used to position an end effector on said positioning means relative to said tool caddy.

36. The system according to claim 35 including at least two alignment cameras mounted to provide at least two orthogonal camera views for aligning a centre of said valve tool with the fluid valve and providing views of contact surfaces located on said valve tool.

37. The system according to claim 36 including features located on said support frame located to allow easy interpretation of position using images from said at least two alignment cameras.

38. A system mounted on a servicing spacecraft for transferring fluid to a client satellite, the client satellite including a tank and a fluid port, the tank being coupled to the fluid port, the fluid port including a fluid valve having a valve actuation nut for opening and closing the fluid valve and an access valve cap on the fluid valve, comprising:
 a fluid transfer system for transferring a fluid from a fluid tank on the servicing spacecraft to the fluid tank on the client satellite, wherein the fluid is selected from the group consisting of fuel and oxidizer;
 a robotic arm having a tool for coupling a fluid line to the fluid port and for decoupling therefrom;
 at least one sensor for determining a relative displacement between said tool and the fluid port;
 a controller in communication with said at least one sensor and said robotic arm, for controlling operation of said robotic arm based on feedback from said at least one sensor; and
 wherein said tool is capable of removing and replacing the access valve cap, coupling the fluid valve to the fluid port, and actuating the valve actuation nut to open and close the fluid valve.

39. The system according to claim 38 wherein the fluid is a mono-propellant and wherein the client satellite is a mono-propellant propulsion system satellite.

40. The system according to claim 38 wherein the servicing spacecraft further includes a docking interface for docking to the client satellite, said docking interface being spatially separated and functionally independent to said tool; wherein in operation, the servicing spacecraft docks to the client satellite prior to coupling said fluid line to the fluid port.

41. The system according to claim 38 wherein said controller includes a teleoperation system configured for remote operation with a human teleoperator issuing commands via a user interface.

42. The system according to claim 38 wherein said controller includes a mixed autonomous/teleoperation control system including:
 a computer controller programmed to operate some or all of the fluid transferring operations, and a teleoperation system configured to have a human teleoperator remotely operate some or all of the system through a user interface, and wherein said mixed autonomous/teleoperation control system is configured to work in any one of three modes, including a first autonomous mode in which said computer controller controls all fluid transferring operations, a second teleoperation mode in which said human teleoperator remotely operates the system through a user interface to control all fluid transferring operations, and a third supervised autonomy mode in which the system is autonomously operated but all autonomous operations are monitored, can be halted and must be approved by a human operator.

43. The system according to claim 38 wherein said at least one sensor includes at least one video camera positioned to view said tool.

44. The system according to claim 38 wherein said at least one sensor is an artificial vision system.

45. The system according to claim 38 wherein said tool includes interchangeable tool modules, said interchangeable tool modules including: at least one first tool module for removing and replacing the access valve cap, and at least one second tool module for engaging the fluid valve for coupling said fluid line to the fluid tank.

46. The system according to claim 45 wherein said tool includes a support frame and a tool module holder mechanism mounted on said support frame configured to accept said interchangeable tool modules, and wherein said tool includes a tool drive mechanism mounted on said support frame for actuating said interchangeable tool modules when seated in said tool module holder mechanism, and wherein said tool includes a clamping mechanism mounted on said support frame to secure said tool to a reaction area on the fluid valve, said clamping mechanism being configured to localize torque generated by said tool for ensuring that any reaction torques from said tool drive mechanism are reacted locally to prevent damage to the fluid valve, and wherein said tool includes a valve actuation mechanism mounted on said support frame to engage and actuate the valve actuation nut.

47. The system according to claim 46 further including a tool caddy which is mountable on the servicing spacecraft, said tool caddy including storage positions for storing and holding said tool, a blanket cutter, a blanket spreader, an outer cap removal and replacement tool, said at least one first tool module, said at least one second tool module, and the access valve cap during fluid transferring operations, said tool caddy including a quick release mechanism for holding said interchangeable tool modules and said access valve cap.

48. The system according to claim 46 wherein said support frame includes a lower base section, a mid base section and an upper base section, said lower base section having a passageway and associated lead-ins configured to receive therein a portion of the fluid valve, and wherein said tool module holder mechanism is mounted in said mid base section such that when one of said interchangeable tool modules is located in said tool module holder mechanism, a portion of said one of said interchangeable tool modules projects into said passageway to engage the fluid valve.

49. The system according to claim 38 wherein said fluid transfer system is further capable of transferring a second fluid from a second fluid tank to a second tank on the client satellite, wherein said second fluid storage tank is coupled to a second fluid port, and wherein said second fluid is selected from the group consisting of fuel and oxidizer;

wherein robotic arm is further capable of attaching a second fluid line to said second fluid port and decoupling said second fluid line therefrom;

wherein said second fluid port includes a second fluid valve and a second valve actuation nut on said second fluid valve for opening and closing said second fluid valve and a second access valve cap on said second fluid valve; and wherein said tool further includes means for removing and replacing said second access valve cap, and means for engaging said second fluid valve for coupling said second fluid line to said second fluid port.

50. The system according to claim 49 wherein the fluid is fuel and said second fluid is oxidizer.

51. The system according to claim 50 wherein the client satellite is a bi-propellant propulsion system satellite.

52. A system mounted on a servicing spacecraft for transferring fluid to a client satellite, the client satellite including a tank and a fluid port, the tank being coupled to the fluid port, the fluid port including a fluid valve having an access valve cap, comprising:

docking means for docking to the client satellite;

fluid transfer means for transferring at least one fluid from at least one fluid tank to at least one fluid storage tank on the client satellite, wherein the fluid is selected from the group consisting of fuel and oxidizer;

tool means for removing and replacing the access valve cap, for coupling a fluid line to the fluid port and decoupling therefrom, and means for opening and closing the fluid valve;

sensing means for determining a relative displacement between said tool means and the fluid port;

positioning means connected to said tool means, for positioning said tool means with respect to the fluid port for coupling and decoupling the fluid line to the fluid port;

control means in communication with said sensing means, said positioning means, and said tool means, for controlling operation of said positioning means and said tool means based on feedback from said sensing means;

wherein said control means is a mixed autonomous/teleoperation control system including: a computer controller programmed to operate some or all of the fluid transferring operations, and a teleoperation system configured to have a human teleoperator remotely operate some or all of the system through a user interface, and wherein said mixed autonomous/teleoperation control system is configured to work in any one of these three modes, including a first autonomous mode in which said computer controller controls all fluid transferring operations, a second teleoperations mode in which said human teleoperator remotely operates the system through a user interface to control all fluid transferring operations, and a third supervised autonomy mode in which the system is autonomously operated but all autonomous operations are monitored, can be halted and must be approved by a human operator; and wherein said sensing means includes at least two video cameras.

* * * * *